(12) United States Patent
Nguyen et al.

(10) Patent No.: US 10,676,942 B2
(45) Date of Patent: Jun. 9, 2020

(54) SCAFFOLDING APPARATUS AND RELATED METHODS

(71) Applicant: The Boeing Company, Chicago, IL (US)

(72) Inventors: David G. Nguyen, Everett, WA (US); Keith B. Barnett, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 15/006,722

(22) Filed: Jan. 26, 2016

(65) Prior Publication Data

US 2017/0211284 A1    Jul. 27, 2017

(51) Int. Cl.
  *E04G 3/24* (2006.01)
  *B64C 1/18* (2006.01)
  *B64F 5/00* (2017.01)
  *B64F 5/10* (2017.01)

(52) U.S. Cl.
  CPC ........... *E04G 3/246* (2013.01); *B64C 1/18* (2013.01); *B64F 5/00* (2013.01); *B64F 5/10* (2017.01)

(58) Field of Classification Search
  CPC ... E04G 3/246; B64F 5/00; B64F 5/10; B64C 1/18; B64C 1/064
  USPC ....... 244/119, 120, 125, 126, 132, 131, 133; 52/651.1
  See application file for complete search history.

(56) References Cited

U.S. PATENT DOCUMENTS

| | | | | |
|---|---|---|---|---|
| 3,938,290 A * | 2/1976 | Wyatt | ................. | E04G 1/06 182/186.8 |
| 4,479,621 A * | 10/1984 | Bergholz | ................. | B64C 1/18 244/117 R |
| 5,048,640 A * | 9/1991 | McConville | ................. | E01D 19/106 182/150 |
| 5,141,078 A * | 8/1992 | Wood | ................. | E04G 1/152 182/119 |
| 5,988,318 A * | 11/1999 | Krause | ................. | F16B 45/02 182/186.7 |

(Continued)

FOREIGN PATENT DOCUMENTS

WO    WO-2016077919 A1 *  5/2016  ............. E04G 3/246

OTHER PUBLICATIONS

European Patent Office, "Extended European Search Report", issued in connection with European Patent Application No. 17150774.2, dated Jun. 26, 2017, 8 pages.

(Continued)

*Primary Examiner* — Theodore V Adamos
(74) *Attorney, Agent, or Firm* — Hanley, Flight & Zimmerman, LLC

(57) ABSTRACT

Scaffolding apparatus and related methods are disclosed. An example scaffolding apparatus includes a beam defining a length between a first end of the beam and a second end of the beam opposite the second end. The length of the beam spans between a first side of a fuselage portion of an aircraft and a second side of the fuselage portion opposite the first side. A first connector is coupled to the first end of the beam. The first connector engages a first stringer on the first side of the fuselage portion to couple the first end of the beam to the fuselage portion. A second connector is coupled to the second end of the beam. The second connector engages a second stringer on the second side of the fuselage portion to couple the second end of the beam to the fuselage portion.

27 Claims, 13 Drawing Sheets

(56) References Cited

U.S. PATENT DOCUMENTS

| | | | | |
|---|---|---|---|---|
| 6,220,392 B1 * | 4/2001 | Schwoerer | ............... | E04G 5/16 182/186.7 |
| 6,305,868 B1 * | 10/2001 | Kinoshita | ............... | E04G 7/305 403/196 |
| 6,530,456 B1 * | 3/2003 | Wallther | ................ | E04G 1/154 182/119 |
| 7,475,850 B2 * | 1/2009 | Vetillard | ................... | B64C 1/18 244/117 R |
| 2002/0014371 A1 * | 2/2002 | Krause | ..................... | E04G 5/16 182/186.8 |
| 2008/0078129 A1 * | 4/2008 | Wood | ..................... | B64C 1/068 52/127.1 |
| 2009/0236472 A1 * | 9/2009 | Wood | ...................... | B64C 1/18 244/119 |
| 2010/0126101 A1 * | 5/2010 | Wood | ....................... | B64C 1/18 52/650.3 |
| 2010/0162935 A1 * | 7/2010 | Khachaturian | ........... | B63C 7/04 114/51 |
| 2012/0061513 A1 * | 3/2012 | Gallant | .................. | B64C 1/061 244/119 |
| 2012/0304579 A1 | 12/2012 | Dezoete | | |
| 2013/0092793 A1 * | 4/2013 | Braeutigam | ........... | B64C 1/068 244/131 |
| 2013/0256060 A1 * | 10/2013 | Wiegers | .................... | E04G 5/08 182/222 |
| 2017/0275898 A1 * | 9/2017 | Woodward | ................ | E04G 1/28 |

OTHER PUBLICATIONS

European Patent Office, "Communication pursuant to Article 94(3) EPC," issued in connection with European Patent Application No. 17150774.2, dated Feb. 22, 2019, 4 pages.

* cited by examiner

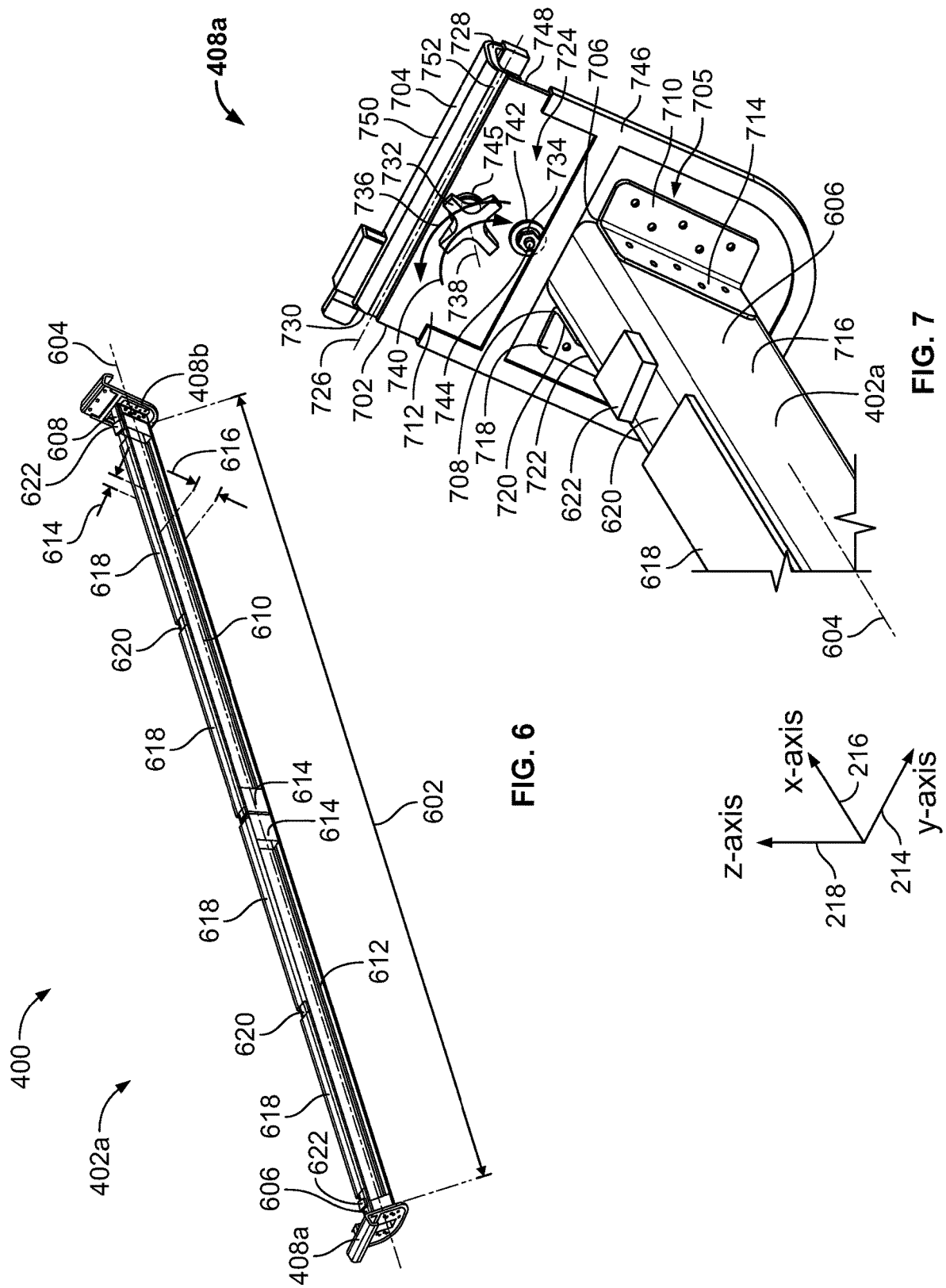

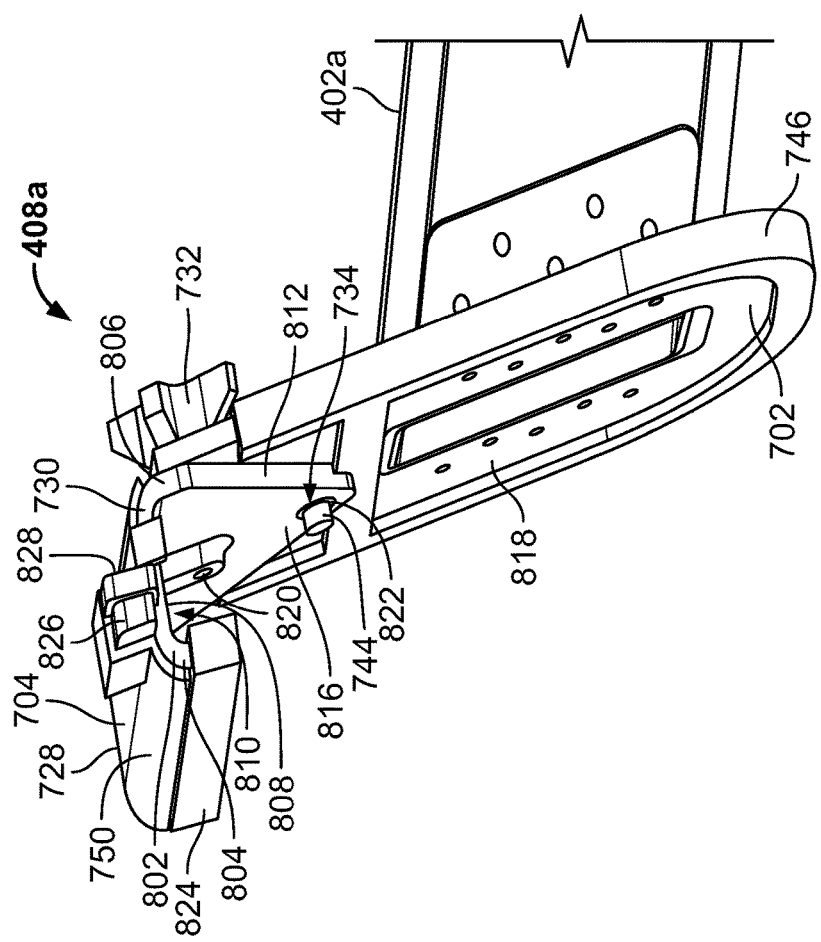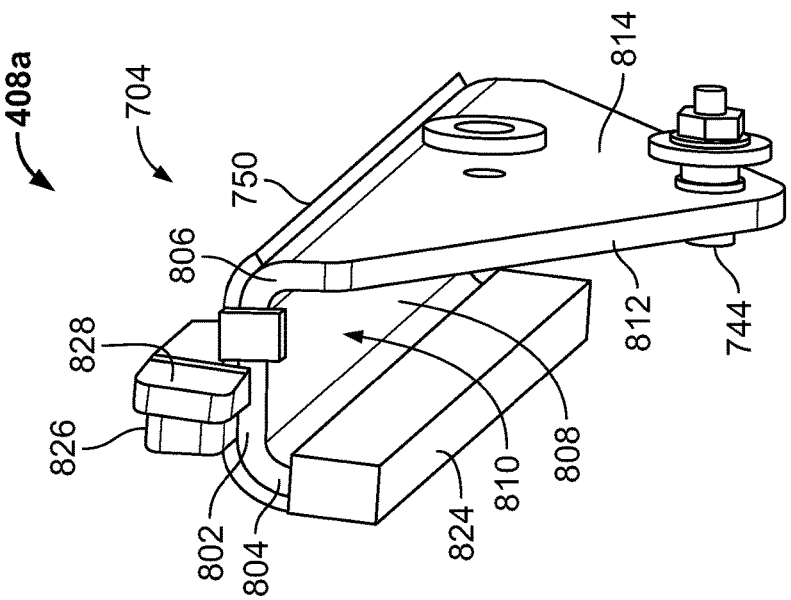

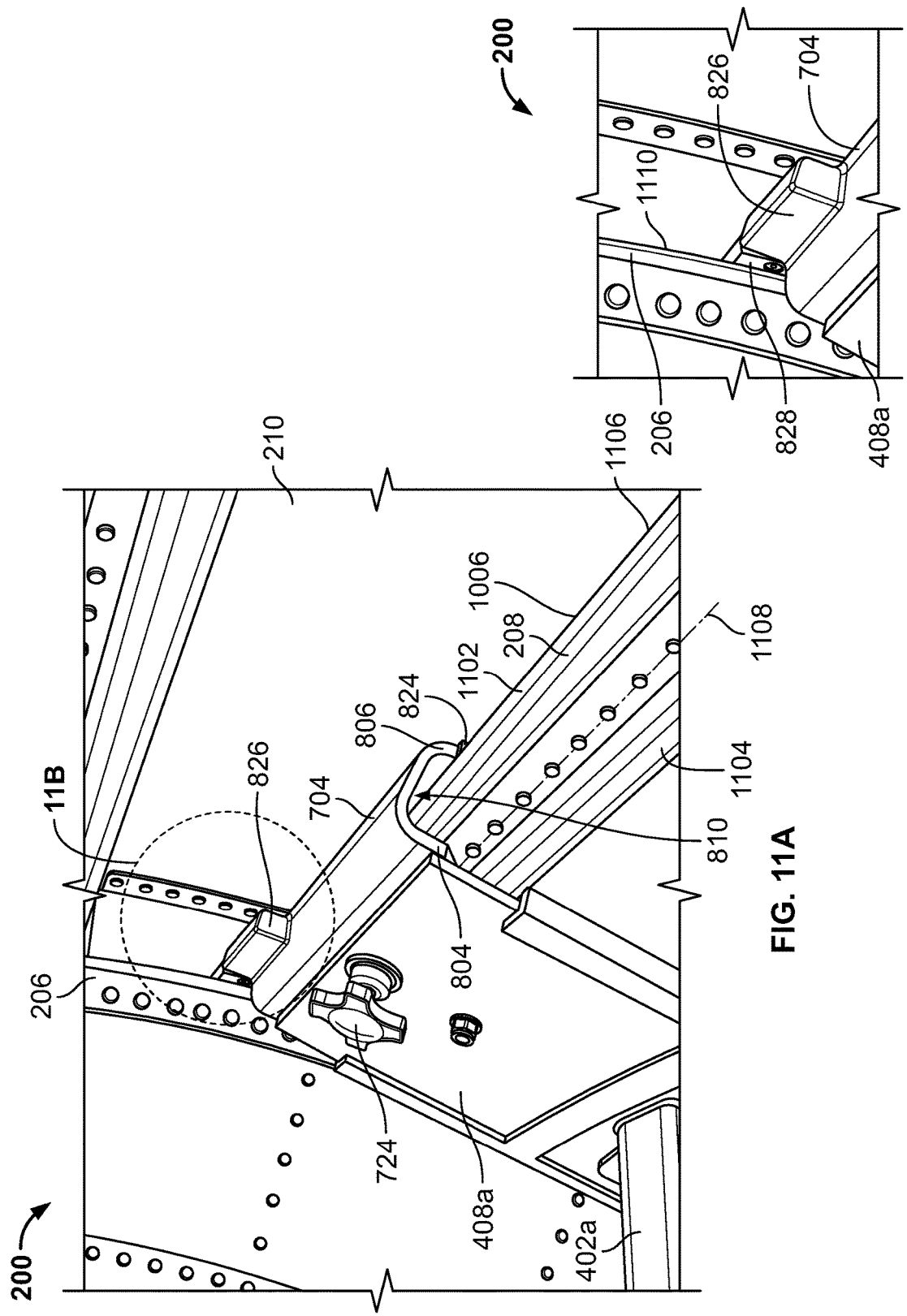

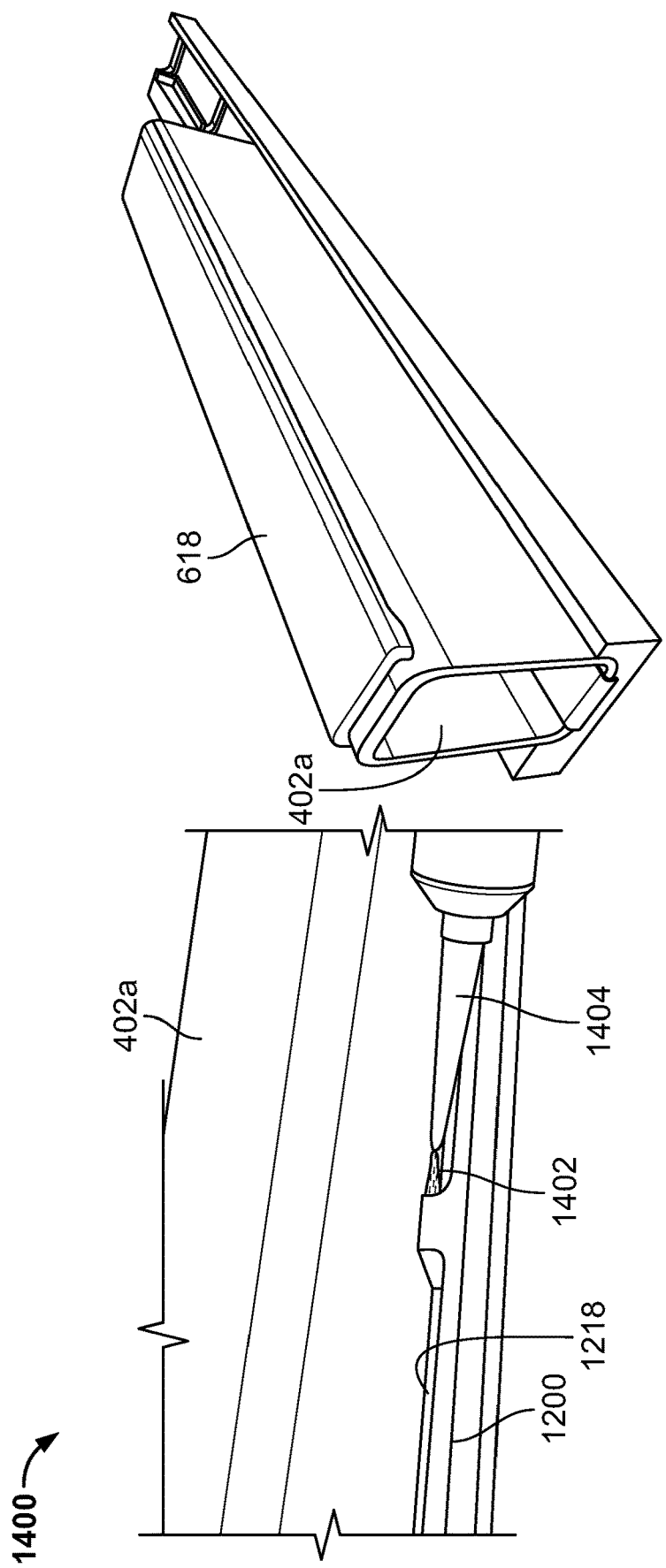

SCAFFOLDING APPARATUS AND RELATED METHODS

FIELD OF THE DISCLOSURE

This patent relates generally to aircraft and, more particularly, to scaffolding apparatus and related methods.

BACKGROUND

The fuselage of commercial aircraft include fuselage portions or sections that are individually assembled and then combined or attached to form the fuselage. However, during assembly of the fuselage portions, interiors of the fuselage portions may be difficult to access. Scaffolding is often employed during manufacturing or assembly of an aircraft to access interior areas of fuselage portions that may otherwise be difficult to access due to, for example, a height of the fuselage. Scaffolding often includes a removable or temporary flooring system that enables personnel to walk or stand in the interior areas of the fuselage portions.

SUMMARY

An example scaffolding apparatus includes a beam defining a length between a first end of the beam and a second end of the beam opposite the second end. The length of the beam spans between a first side of a fuselage portion of an aircraft and a second side of the fuselage portion opposite the first side. A first connector is coupled to the first end of the beam. The first connector is to engage a first stringer on the first side of the fuselage portion to couple the first end of the beam to the fuselage portion. A second connector is coupled to the second end of the beam. The second connector is to engage a second stringer on the second side of the fuselage portion to couple the second end of the beam to the fuselage portion.

In another example, a scaffolding apparatus includes a beam and a connector coupled to the beam. The connector has a support plate and a hook coupled to the support plate. The hook is to couple to a stringer of a fuselage of an aircraft to couple the beam to the fuselage.

An example method of assembling a scaffolding apparatus includes positioning a lateral beam between a first side of a fuselage and a second side of the fuselage; engaging a first connector of the lateral beam to a first stringer on the first side of the fuselage; and engaging a second connector of the lateral beam to a second stringer on the second side of the fuselage.

BRIEF DESCRIPTION OF THE DRAWINGS

FIG. 6 illustrates an example lateral beam of the example frame assembly of FIG. 4.

FIG. 7 is a perspective view of a first connector of the example lateral beam of FIG. 6.

FIG. 8A is another enlarged view of the example first connector of FIG. 7.

FIG. 8B is a perspective view of a hook portion of the example first connector of FIGS. 7 and 8A.

FIG. 11A is an enlarged, perspective view of the example connector of FIGS. 7, 8A and 8B coupled to a stringer of the example fuselage portion.

FIG. 11B is an enlarged view of the example connector of FIG. 11A.

FIG. 14 illustrates a method of attaching an anti-skid material to an upper surface of the beam of FIG. 13.

FIG. 15 illustrates the example beam removed from the example mold of FIGS. 12-14 after the anti-skid material has cured or attached to the upper surface of the example beam.

Figure 1:
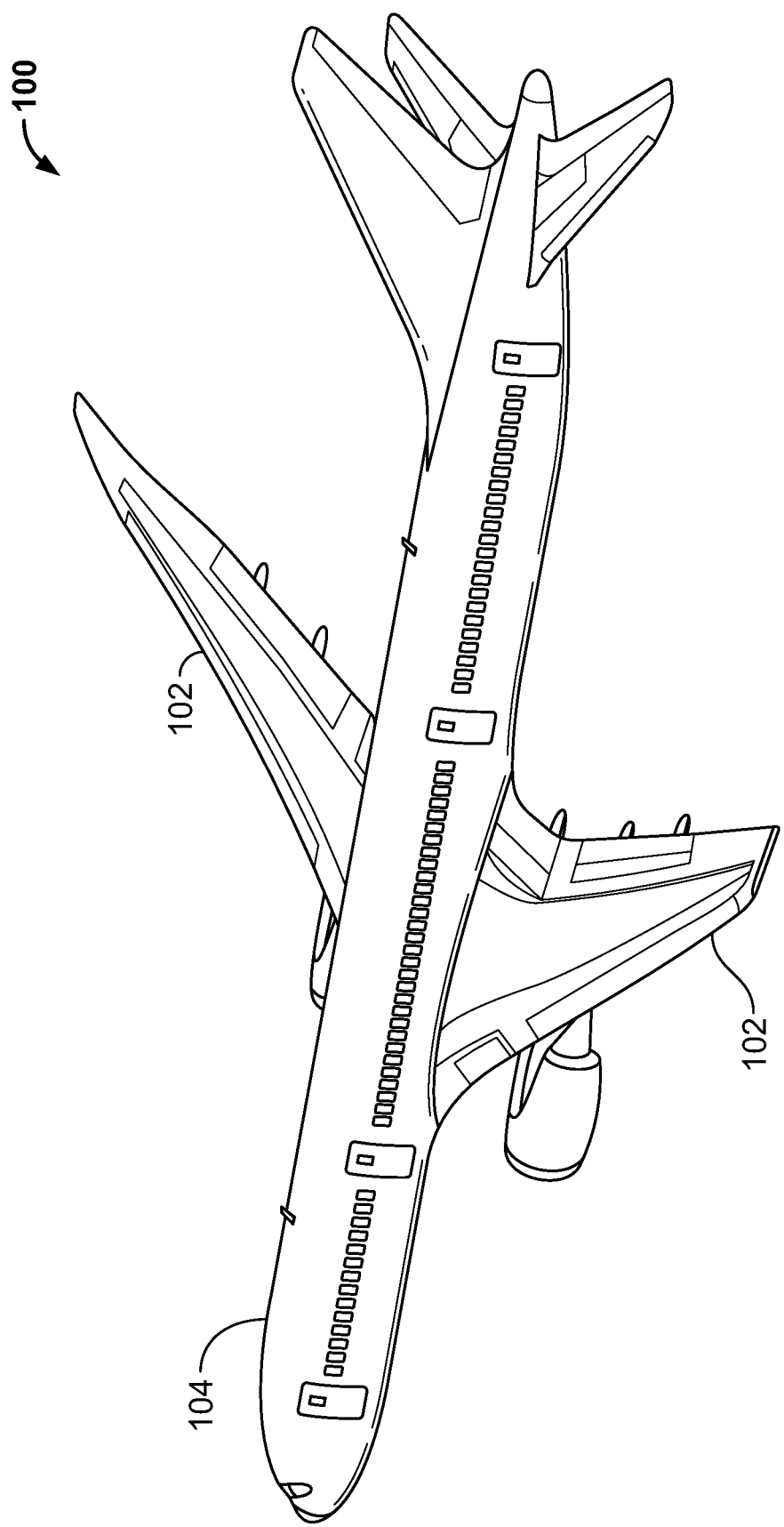
FIG. 1 depicts an example aircraft that may be assembled using an example scaffolding in accordance with the teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts. As used herein, substantially and approximately mean within about 10% (e.g., 10 degrees) different than the number at issue. For example, substantially perpendicular means 90 degrees plus or minus 10%. For example, approximately 90 degrees means 90 degrees plus or minus 10% (e.g., between about 81 degrees and 99 degrees). In some examples, substantially parallel means 0 degrees plus or minus 10 degrees.

DETAILED DESCRIPTION

Scaffolding is often employed to manufacture fuselage sections or portions of commercial aircraft. Scaffolding may include various sections or floorboards that are supported by a plurality of structural supports or frames. A structural support may be composed of metal (e.g., aluminum) and include various trusses or beams (e.g., that are welded together) to form the support. In some examples, a support structure may be a permanent structure. The structural supports are typically positioned in a grid-like pattern inside a housing or a fuselage portion and coupled together and/or to a frame of the fuselage portion via fasteners (e.g., pins) to prevent the supports from sliding or moving when personnel traverse the floor boards supported by the supports. The supports may be heavy, expensive to manufacture, and/or complex to install. For example, some known scaffolding may take over an hour to install within a fuselage portion. Additionally, known supports may be relatively heavy (e.g., each support may weigh up to 100 pounds (45 kilograms)), which may require multiple personnel (e.g., three or more personnel) to install due to the heavy nature of each support. Furthermore, known support structures may cause tool marks and/or damage to the fuselage portion of the aircraft during assembly or removal of the supports from the fuselage, thereby increasing manufacturing time and costs to repair the tool marks and/or damage caused by the supports.

The example scaffolding disclosed herein promote safety, are relatively cheaper to manufacture, and/or significantly increase ease of installation and/or removal from, for example, a housing such as a fuselage portion of an aircraft. Compared to some known scaffolding employed for use with a fuselage of an aircraft, the example scaffolding disclosed herein may provide an overall weight reduction of approximately 475 pounds (215 kilograms) and may reduce the number of components by approximately 40 pieces. As a result, the example scaffolding disclosed herein significantly reduces the amount of time required to install within a housing or fuselage portion of an aircraft (e.g., between 10 minutes and 20 minutes compared to over an hour for known scaffolding). Additionally, the example scaffolding disclosed herein is relatively light weight and can be installed by a single worker (e.g., as opposed to at least four workers for installing known scaffolding).

The example scaffolding disclosed herein provides a secure floor including modular panels that do not move, tilt, flex, or otherwise present an unsafe condition as workers traverse the scaffolding during assembly of a housing or a fuselage portion. Additionally, the modular panels of the example scaffolding may be easily removed to enable access to the area underneath a modular panel and/or removal of the scaffolding after assembly of the fuselage portion is complete. The scaffolding disclosed herein provides a relatively flat surface (e.g., a horizontal walking surface) that is free of protrusions to minimize tripping or other hazards.

Some example scaffolding disclosed herein include a frame assembly having a plurality of beams that may be positioned in grid-like pattern to form a plane (e.g., a substantially horizontal plane) that supports a plurality of floorboards or modular panels when assembling a housing (e.g., a fuselage). Each of the beams of the example scaffolding disclosed herein includes a feature or connector (e.g., a first hook) on a first end of the beam and a second feature or connector (e.g., a second hook) on a second end of the beam opposite the first end. The beam may span an area defined by a first side wall of a housing and a second side wall of the housing opposite the first side wall when the beam is coupled to the first and second side walls. For example, to couple the beam to the first and second walls, the first connector (e.g., a first hook) engages (e.g., hooks to) a first crossbar or first longitudinal beam (e.g., a first support beam) of the first wall and the second connector engages (e.g., hooks to) a second crossbar or a second longitudinal beam (e.g., a second support beam) of the second wall. In some examples, the cross-bars or longitudinal beams may be provided via a first frame member or structure positioned or oriented (e.g., removably positioned) toward or relative to the first wall of a housing and a second frame member positioned or oriented (e.g., removably positioned) toward or relative to a second wall of the housing. Thus, moving the beam in a vertical manner relative to the first and second crossbars attaches the beam to and/or releases the beam from the respective first and second side walls. In some examples, the beams of the scaffolding may be composed of a relatively lightweight material such as, for example, carbon fiber polymer reinforced material, to facilitate movement (e.g., lifting) of the beam in a vertical direction. The example scaffolding apparatus disclosed herein may be employed in a housing such as a fuselage, a boat, a building, a spaceship, a recreational vehicle (RV) and/or any other application requiring use of an elevated platform.

In some examples, the scaffolding disclosed herein may be employed during assembly of a housing or fuselage of an aircraft. In some such examples, a beam of an example frame assembly disclosed herein may span an area between a first wall of a fuselage portion and a second wall of a fuselage portion opposite the first wall (e.g., in a direction cross-wise or non-parallel relative to a longitudinal axis of the fuselage). In this manner, the first connector of the beam may engage (e.g., hook onto) a first stringer of the fuselage portion and the second connector (e.g., a second hook) may engage (e.g., hook onto) a second stringer of the fuselage portion. In some examples, each of the first and second connectors may include: a stop block (e.g., a finger or protrusion) to engage a frame of the fuselage portion to transfer forces or loads caused by a deflection of the beam along a longitudinal axis of the beam to the frame to prevent or reduce damaging (e.g., pulling) the first and second stringers that are engaged by the respective first and second connectors. In some examples, one of the connectors may include an adjustor and the other connector may be fixed to the beam. The adjustor enables adjustment of an orientation of an upper surface of the beam relative to a ground surface or Earth when the beam is coupled to the first stringer and the second stringer. In some examples, the adjustor enables bi-directional movement or adjustment of the connector in a first direction along a length (e.g., along a longitudinal axis) of the stringers and a second direction along a width of the stringers substantially perpendicular to the first direction. In some examples, each of the first and second connectors may include an edge protector (e.g., composed of plastic such as plastisol) to prevent damage to the respective first and second stringers. In some examples, the beams of the example scaffolding disclosed herein may include an anti-skid element (e.g., a strip of polyurethane) to prevent the floorboards from sliding relative to the beams when personnel traverse the floorboards. The anti-skid layer may be attached or coupled to the beams via manufacturing techniques (e.g., via bonding) without the use of adhesives or other bonding agents (e.g., epoxies) and/or secondary bonding process(es).

FIG. 1 illustrates an aircraft 100 including wings 102 (e.g., a right wing and a left wing) extending laterally outward from a fuselage 104. The fuselage 104 is formed by a plurality of fuselage sections or portions.

Figure 2:
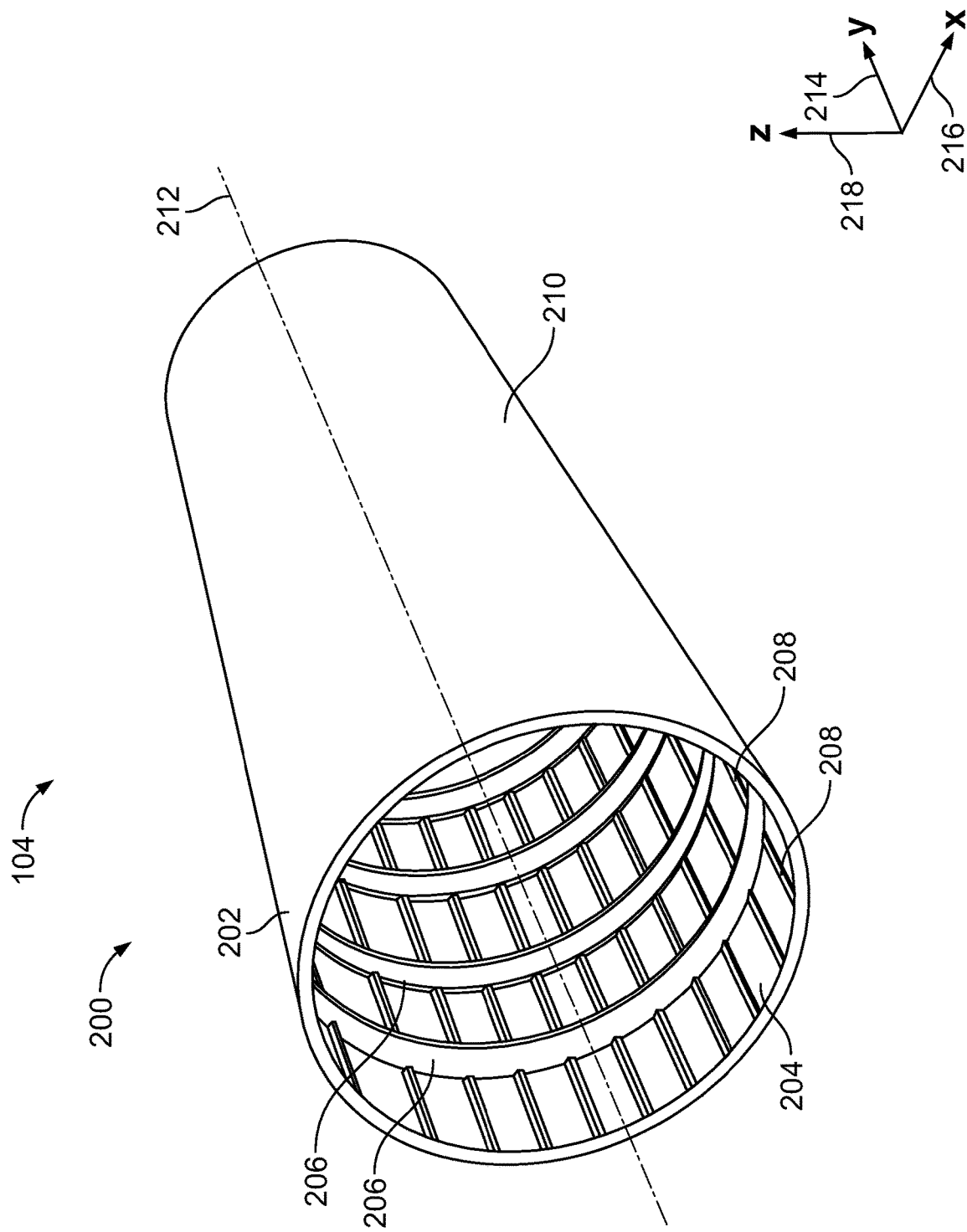
FIG. 2 is a perspective view of a fuselage portion of the example aircraft of FIG. 1.

FIG. 2 is a perspective view of a fuselage section or fuselage portion 200 (e.g., a tail portion, a housing, etc.) of the fuselage 104 of the example aircraft 100. The fuselage portion 200 of the illustrated example includes a first fuselage portion or upper fuselage portion 202 and a second fuselage portion or lower fuselage portion 204 that are coupled via a plurality of frames 206 that define a cross-sectional shape of the fuselage 104. Stringers 208 of the illustrated example span the length of the fuselage portion 200 between the frames 206. An outer skin 210 of the fuselage 104 is coupled or attached to the stringers 208 of the fuselage 104. In the illustrated example, the fuselage portion 200 defines a longitudinal axis 212, which is perpendicular relative to a cross-section of the fuselage portion 200. In the illustrated examples disclosed herein, a direction along (e.g., substantially parallel relative to) the longitudinal axis 212 of the fuselage portion 200 corresponds to a fuselage y-axis direction 214. In other words, the longitudinal axis 212 is parallel (or substantially parallel) relative to the fuselage y-axis direction 214. A direction substantially perpendicular to the longitudinal axis 212 and spanning a cross-section of the fuselage portion 200 in a substantially horizontal direction corresponds to a fuselage x-axis direction 216. A direction substantially perpendicular to the longitudinal axis 212 and spanning a cross-section of the fuselage portion 200 in a substantially vertical direction corresponds to a fuselage z-axis direction 218 (a direction perpendicular to the fuselage x-axis direction 216 and the fuselage y-axis direction 214).

Figure 3:
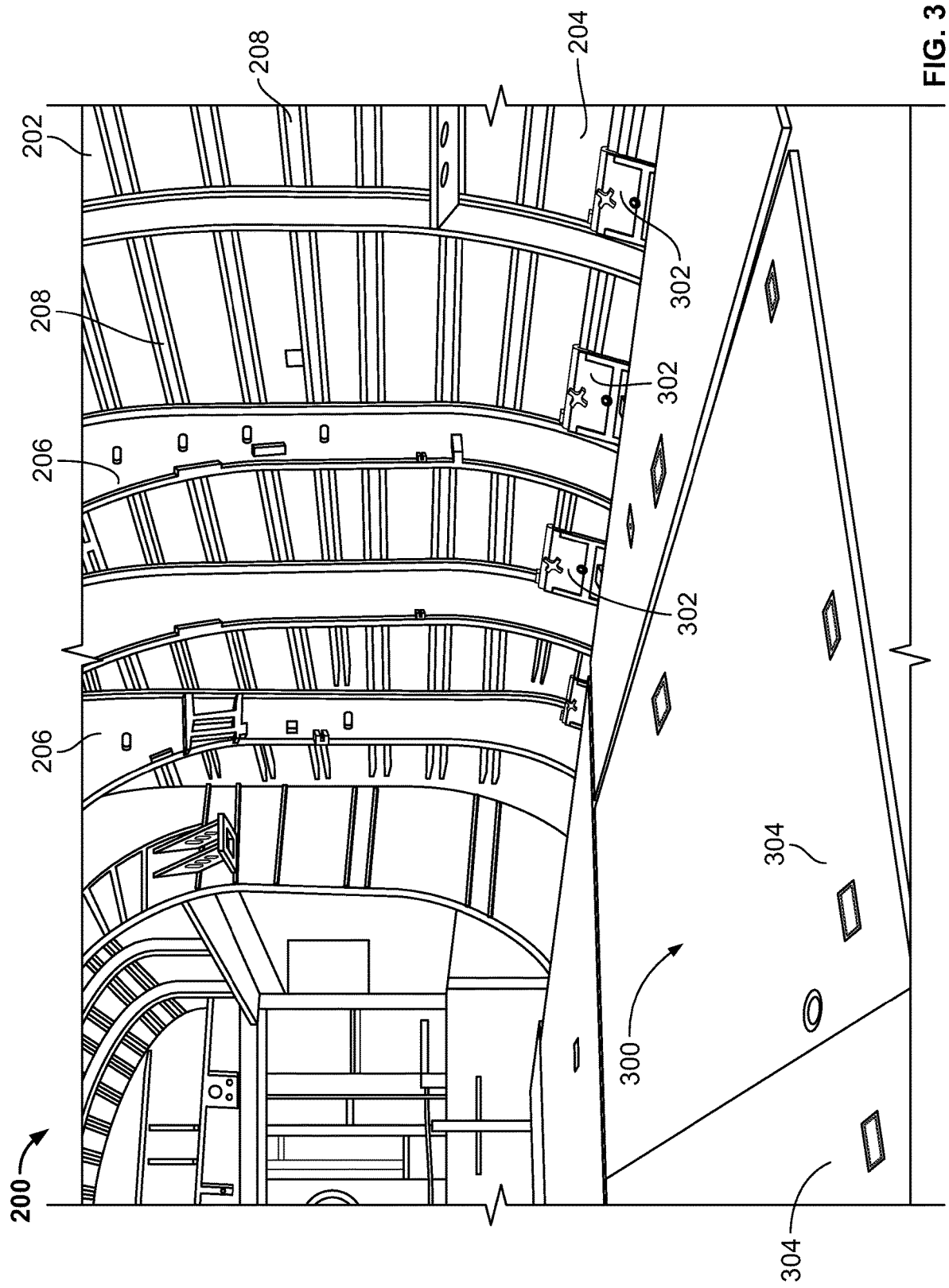
FIG. 3 illustrates the example fuselage portion of FIG. 2 employing the example scaffolding disclosed herein.

FIG. 3 is a partial perspective view of the fuselage portion 200 employing a scaffolding 300 constructed in accordance with the teachings of this disclosure. The scaffolding 300 of the illustrated example is coupled to the fuselage portion 200 to facilitate assembly of the fuselage portion 200. The scaffolding 300 of the illustrated example includes a support structure 302 (e.g., providing a horizontal plane) to support floorboards or modular panels 304 that can be traversed by personnel during assembly of the fuselage portion 200. More specifically, the support structure 302 of the illustrated example suspends or elevates the modular panels 304 (e.g., relative to a floor) of the fuselage portion 200. As disclosed in greater detail below, the example support structure 302 of the illustrated example may be assembled (e.g., via interference connection) without the use of screws, pins, bolts or like fasteners to significantly facilitate installation of the scaffolding 300 within the fuselage portion (e.g., reduces installation time by approximately 1 hour). For example, the support structure 302 may be assembled without fastening, for example, the support structure 302 to the frame 206 of the fuselage portion 200. When the scaffolding is no longer needed, the scaffolding 300 is removed or disassembled from the fuselage portion 200.

Figure 4:
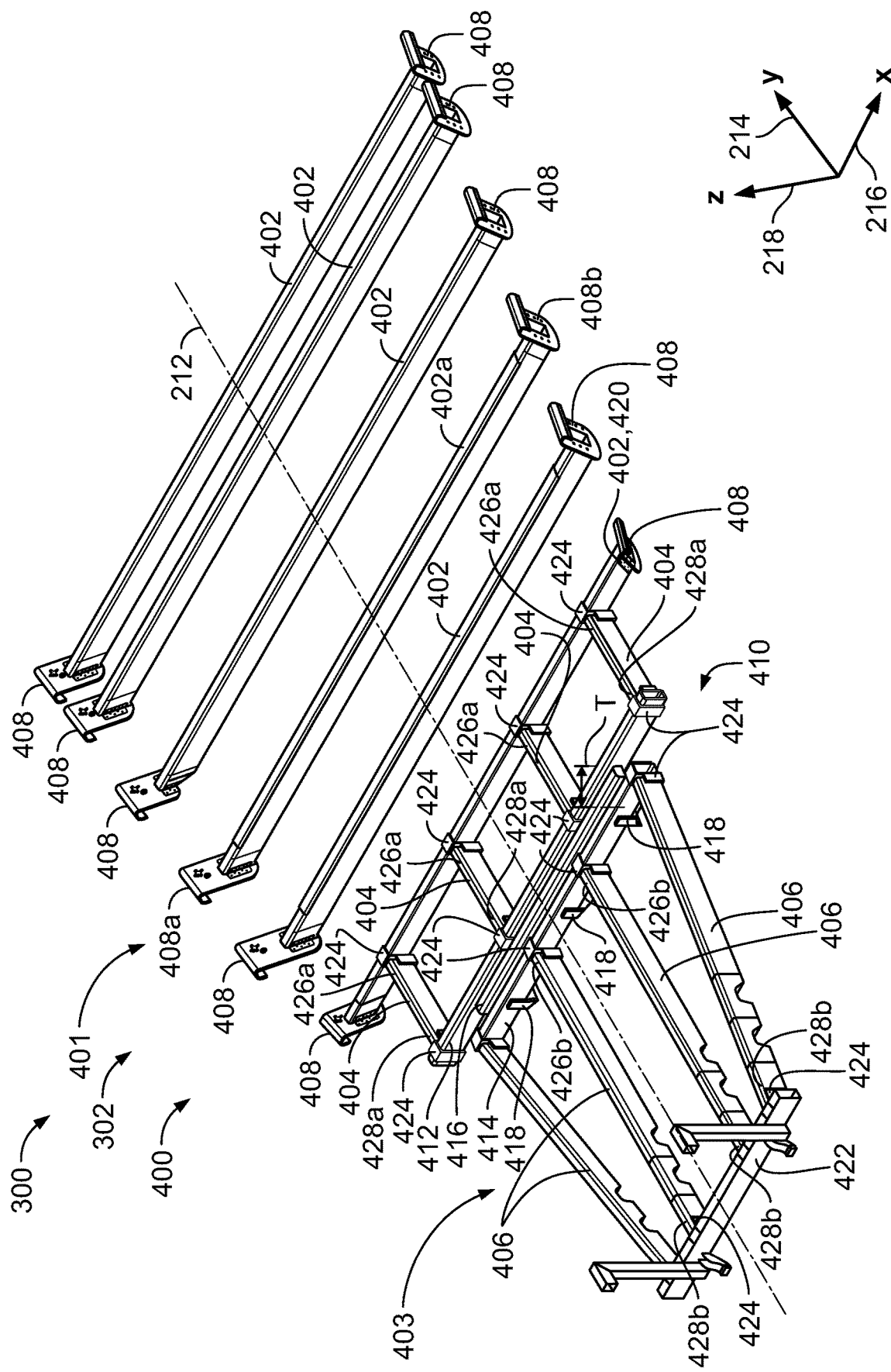
FIG. 4 is an example frame assembly of the example scaffolding of FIG. 3.

FIG. 4 is a perspective view of the support structure 302 of the example scaffolding 300 of FIG. 3. The support structure 302 of the scaffolding 300 of the illustrated example includes a frame assembly 400. The frame assembly 400 of the illustrated example includes a first support structure 401. The first support structure 401 has a plurality of lateral beams 402. The lateral beams 402 are positioned generally non-parallel (e.g., substantially perpendicular) relative to the longitudinal axis 212 (e.g., the fuselage y-axis direction 214) of the fuselage portion 200. To couple the lateral beams 402 to the fuselage portion 200, the lateral beams 402 employ connectors 408. As described in greater detail below, the connectors 408 of the lateral beams 402 engage or attach to the stringers 208 (FIG. 2) of the fuselage portion 200 and may attach without using screws or pins. As disclosed below, a first connector 408a of a lateral beam 402a couples or hooks onto a first stringer of the fuselage portion 200 and a second connector 408b of the lateral beam 402a couples or hooks onto a second stringer of the fuselage portion 200. Additionally, the lateral beams 402 are not interconnected or interlocked with each other.

In the illustrated example, the frame assembly 400 includes a second support structure 403. The first support structure 401 and the second support structure 403 can be used in combination and/or may be used as separate frames. In some examples, the second support structure 403 does not form part of the frame assembly 400. The second support structure 403 of the illustrated example includes a first plurality of longitudinal beams 404 and a second plurality of longitudinal beams 406. The longitudinal beams 404 and 406 of the illustrated example are coupled together via a bridge assembly 410. The bridge assembly 410 of the illustrated example includes a front beam 412, a rear beam 414 and an intermediate beam 416. In the illustrated example, the front beam 412, the rear beam 414 and the intermediate beam 416 are positioned or oriented substantially parallel to the lateral beams 402 (e.g., substantially perpendicular to the longitudinal axis 212 of the fuselage portion 200). In the illustrated example, the front beam 412, the rear beam 414 and the intermediate beam 416 are coupled together via one or more holding brackets 418. The holding brackets 418 of the illustrated example are U-shaped brackets having a length substantially equal to a thickness T of the front beam 412, the rear beam 414 and the intermediate beam 416 when the bridge assembly 410 is coupled together. In this manner, the front beam 412, the rear beam 414 and the intermediate beam 416 are coupled together or retained together (e.g., via interference fit). In other words, to couple the front beam 412, the rear beam 414 and the intermediate beam 416 during assembly, the front beam 412, the rear beam 414 and the intermediate beam 416 are positioned or placed in the holding brackets 418 and may be held together without the use of screws, pins, clamps and/or other similar fastener(s).

Additionally, in the illustrated example the second support structure 403 is provided for portions of the fuselage 104 having a varying (e.g., a decreasing or narrowing) width or diameter. For example, the second support structure 403 may be employed with a tail of the fuselage 102, but may not be needed for a middle section of the fuselage 102 (e.g., a section having a constant or non-varying diameter) In the illustrated example, the longitudinal beams 404 are supported by the front beam 412 of the bridge assembly 410 and an end beam 420 of the lateral beams 402, and the longitudinal beams 406 are supported by the rear beam 414 of the bridge assembly 410 and a carriage 422. To facilitate attachment or coupling of the longitudinal beams 404 to the front beam 412 and the end beam 420, the front beam 412 and the end beam 420 include interface connectors 424. Similarly, to facilitate attachment or coupling of the longitudinal beams 406 to the rear beam 414 and the carriage 422, the rear beam 414 and the carriage 422 include the interface connectors 424. During assembly, the interface connectors 424 of the end beam 420 receive respective ones of first ends 426a of the respective longitudinal beams 404 and the interface connectors 424 of the front beam 412 receive ones of second ends 428a of the respective longitudinal beams 404. Similarly, the interface connectors 424 of the rear beam 414 receive respective ones of first ends 426b of the respective longitudinal beams 406 and the interface connectors 424 of the carriage 422 receive respective ones of second ends 428b of the longitudinal beams 406. More specifically, each of the interface connectors 424 retains (e.g., via interference fit connection) the respective first ends 426a, 426b and second ends 428a, 428b of the respective longitudinal beams 404 and 406 without requiring use of removable screws or fasteners. Thus, assembly of the lateral beams 402, the longitudinal beams 404, 406, the holding brackets 418, the bridge assembly 410, and the interface connectors 424 significantly reduces assembly time (e.g., by approximately 70% compared to known scaffolding) needed to assemble the frame assembly 400. Although the frame assembly 400 of the illustrated example includes the longitudinal beams 404, 406, the bridge assembly 410 and the carriage 422, in some examples, the support structure 302 and/or the frame assembly 400 may only include the lateral beams 402. For example, other example fuselage portions (e.g., a middle fuselage portion) may only require use of the lateral beams 402 to form a grid-like structure that supports the modular panels 304. In some such examples, the longitudinal beams 404, 406, the bridge assembly 410, the carriage 422 and the interface connectors 424 are not provided.

Figure 5A:
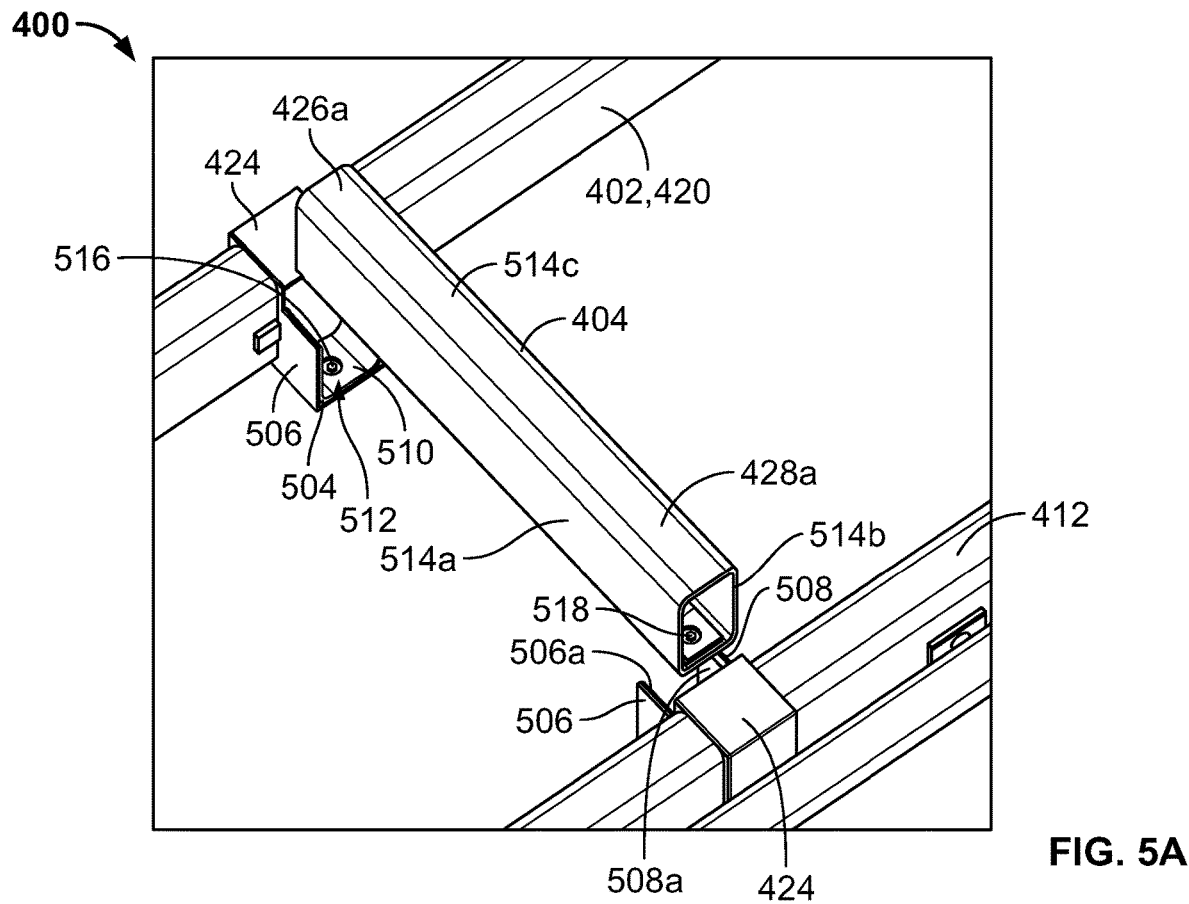
FIG. 5A is a partial, enlarged view of the example frame assembly of FIG. 4 showing a longitudinal beam decoupled from the example frame assembly of FIG. 4.
Figure 5B:
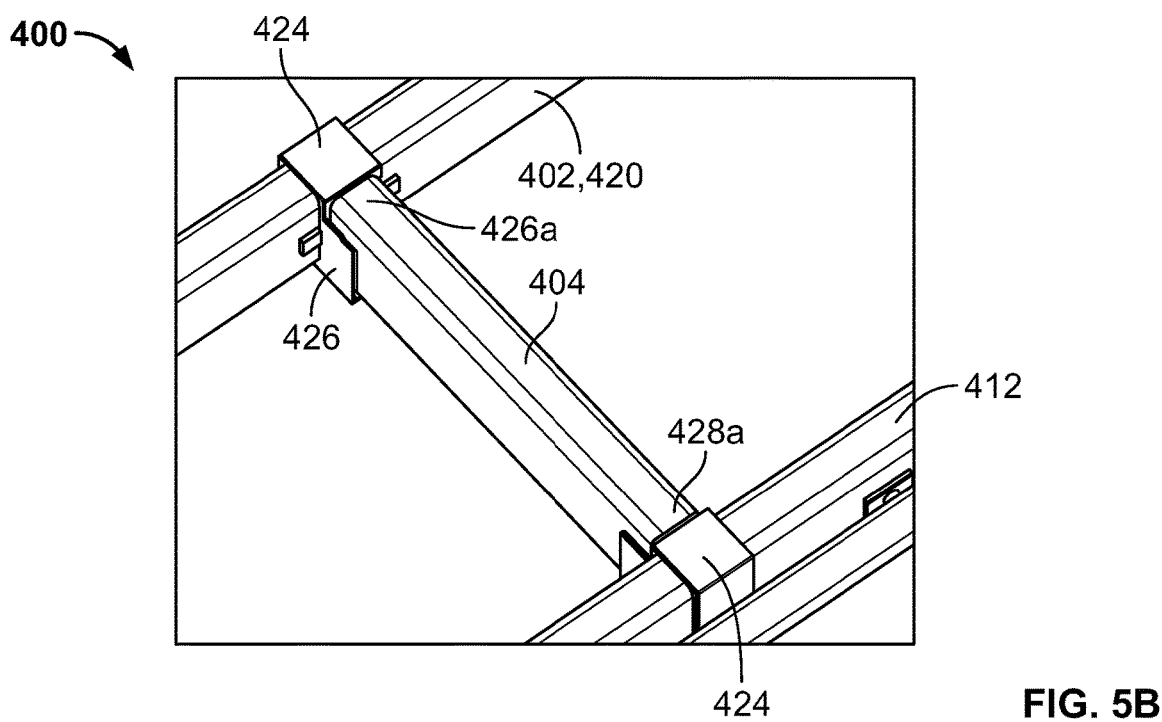
FIG. 5B is a partial, enlarged view of the example frame assembly of FIGS. 4 and 5A showing the longitudinal beam coupled to the example frame assembly of FIG. 4.

FIG. 5A illustrates an enlarged portion of the frame assembly 400 of FIG. 4 showing one of the longitudinal beams 404 decoupled from the end beam 420 and the front beam 412 of the frame assembly 400. Referring to FIGS. 5A and 5B, the first end 426a of the longitudinal beam 404 is decoupled from the interface connector 424 of the end beam 420 and the second end 428a of the longitudinal beam 404 is decoupled from the interface connector 424 of the front beam 412. Each of the interface connectors 424 of the illustrated example includes a housing 504 having a first wall 506 opposite a second wall 508 and a lower surface 510 to define a U-shaped cavity 512 (e.g., to receive the respective ones of the ends 426a, 426b, 428a, and 428b of the longitudinal beams 404 and 406). The cavity 512 of the illustrated example is configured or sized to receive one of the first or second ends 426a and 428a of the longitudinal beam 404. For example, an outer surface 514a of the longitudinal beam 404 engages or contacts (e.g., directly contacts) an inner surface 506a of the first wall 506 and an outer surface 514b of the longitudinal beam 404 engages or contacts (e.g., directly contacts) an inner surface 508a of the second wall 508 when the longitudinal beam 404 is coupled to the interface connectors 424. Thus, for example, the end 426a of the longitudinal beam 404 is captured between the first wall 506, the second wall 508 and the lower surface 510 of the interface connector 424 of the end beam 420 when the first end 426a is positioned in the cavity 512 of the interface connector 424.

Each of the interface connectors 424 of the illustrated example (e.g., positioned on the end beam 420, the front beam 412, the rear beam 414 and the carriage 422) includes a fastener 516 (e.g., a guide pin) and each of the first ends 426a, 426a and the second ends 428a, 428b of the respective longitudinal beams 404 and 406 includes an opening 518. The fastener 516 of the illustrated example projects from the lower surface 510 of the cavity 512 in a direction toward an upper surface 514c of the longitudinal beam 404. The opening 518 of the illustrated example is to receive the fastener 516 of the interface connectors 424 to retain or locate the longitudinal beam 404 relative to the end beam 420 and the front beam 412. In the illustrated example, the fastener 516 includes a bullet nose pin and the opening 518 includes a bushing to receive the fastener 516. In some examples, the interface connectors 424 do not include the fastener 516, and the first ends first ends 426a, 426b and the second ends 428a, 428b of the respective longitudinal beams 404 and 406 do not include the opening 518.

FIG. 5B illustrates the enlarged portion of the frame assembly 400 of FIG. 4 showing the longitudinal beam 404 coupled to the front beam 412 and the end beam 420 of the frame assembly 400. To couple the longitudinal beam 404 to the end beam 420 and the front beam 412, the first end 426a of the longitudinal beam 404 is positioned or placed (e.g., rests) in the cavity 512 of the interface connector 424 of the end beam 420 and the second end 428a of the longitudinal beam 404 is positioned or placed (e.g., rests) in the cavity 512 of the interface connector 424 of the front beam 412. Thus, the first ends 426a and 428a of the longitudinal beam 404 are placed in the respective interface connectors 424 without the use of screws or removable fasteners. The first ends 426a and 428a and the second ends 426b and 428b of the longitudinal beams 404 and 406 of the frame assembly 400 couple to the respective ones of the interface connectors 424 in the same manner as described in connection with the beam 404 of FIG. 5B.

FIG. 6 is a perspective view of the lateral beam 402a of the example frame assembly 400 of FIG. 4. The lateral beam 402a of the illustrated example defines a length 602 in a direction along a longitudinal axis 604 between a first end 606 of the lateral beam 402a and a second end 608 of the lateral beam 402a opposite the first end 606. The first end 606 of the lateral beam 402a includes the first connector 408a and the second end 608 of the lateral beam 402a includes the second connector 408b. As described in greater detail below, the first connector 408a is adjustable relative to the lateral beam 402a and the second connector 408b is fixed relative to the lateral beam 402a. The lateral beam 402a of the illustrated example includes a first body 610 joined to a second body 612 via a beam splice 614. However, in other examples, the first body 610 and the second body 612 may be formed as a single unitary member. The lateral beam 402a may be configured having any suitable dimensional envelope or profile. For example, the lateral beam 402a may have a thickness 614 of approximately 1-6 inches, a height 616 may be approximately 2-8 inches and the length 602 may be approximately 90-100 inches. To provide a relatively lightweight beam, the lateral beam 402a may be composed of a composite material such as, for example, carbon fiber reinforced polymers. However, in some examples, the lateral beam 402a may be composed of metal, alloy(s), composite (s) and/or any other material(s).

The lateral beam 402a of the illustrated example includes an anti-skid layer 618 (e.g., a pad or coating) positioned on an upper surface 620 of the lateral beam 402a. The anti-skid layer 618 prevents the modular panels 304 (FIG. 3) from sliding relative to the upper surface 620 of the lateral beam 402a when the modular panels 304 (FIG. 3) are positioned on the anti-skid layer 618 of the lateral beam 402a. The anti-skid layer 618 may be composed of polymer material such as, for example, a polyurethane material and/or any other material(s). FIGS. 10-13 disclose a method for applying or attaching the anti-skid layer 618 to the upper surface 620 of the lateral beam 402a. The lateral beam 402a of the illustrated example includes a modular panel hard stop 622 protruding from the upper surface 620 of the lateral beam 402a to limit or restrict movement of the modular panels 304 in the fuselage x-axis direction 216 toward the first connector 408a and the second connector 408b.

FIG. 7 is a partial, perspective view of the first end 606 of the lateral beam 402a and the first connector 408a adjacent the first end 606 of the lateral beam 402a. The first connector 408a of the illustrated example includes a support plate 702 and a hook 704. In the illustrated example, the first connector 408a is coupled to the first end 606 of the lateral beam 402a via a beam/support plate interface 705. The beam/support plate interface 705 of the illustrated example includes a bracket assembly. For example, the beam/support plate interface 705 includes a first bracket 706 (e.g., an L-bracket) and a second bracket 708 (e.g., an L-bracket). The first bracket 706 includes a first leg 710 coupled or attached to a first face 712 of the support plate 702 and a second leg 714 coupled to a first side or outer surface 716 of the lateral beam 402a. The first face 712 of the support plate 702 is oriented toward the first end 606 of the lateral beam 402a and the first face 712 is non-parallel relative to the first side 714 of the lateral beam 402a when the support plate 702 is coupled to the lateral beam 402a. The second bracket 708 of the illustrated example includes a first leg 718 coupled or attached to the first face 712 of the support plate 702 and a second leg 720 coupled or attached to a second side or outer surface 722 of the lateral beam 402a opposite the first side 716. The first bracket 706 and the second bracket 708 include openings to receive fasteners to attach the first bracket 706 and the second bracket 708 to the lateral beam 402a and the support plate 702. In some examples, the beam/support interface 705 may include a weld to couple the lateral beam 402a and the support plate 702 or the beam/support interface 705 and the lateral beam 402a may be integrally formed. Thus, the support plate 702 of the illustrated example is fixed to the first end 606 of the lateral beam 402a and does not pivot or rotate relative to the first end 606 of the lateral beam 402a. In other examples, however, the support plate 702 may be pivotally coupled relative to the first end 606 of the lateral beam 402a to enable adjustment of the support plate 702 relative to the fuselage y-axis direction 214, the fuselage z-axis direction 218 and/or the fuselage x-axis direction 216.

The hook 704 of the illustrated example is pivotally or movably coupled to the support plate 702. To enable adjustment of the hook 704 relative to the support plate 702, the first connector 408a includes an adjustor 724. In particular, the adjustor 724 of the illustrated example enables adjustment of an orientation of the hook 704 relative to the support plate 702 along a longitudinal axis 726 of the hook 704. More specifically, a first edge 728 of the hook 704 may move relative to a second edge 730 of the hook 704 opposite the first edge 728 to enable alignment of the hook 704 relative to the stringer 208 (FIG. 2) of the fuselage portion 200 when the lateral beam 402a is coupled to the fuselage portion 200. In other words, the adjustor 724 allows the hook 704 of the first connector 408a to rotate or pivot relative to the support plate 702 to adjust an angle of the hook 704 relative to an angle of a stringer (e.g., the stringer 208) to which the hook 704 is to engage to enable the stringer 208 to lie within the hook 704 when the hook 704 is mounted to the stringer 208. Additionally, the adjustor 724 enables lateral adjustment of the hook 704 in the fuselage x-axis direction 216 (e.g., a lateral direction away and/or toward the support plate 702) to facilitate or ease installation (e.g., attachment and/or removal) of the hook 704 relative to (e.g., to and/or from) the stringer 208. In this manner, the adjustor 724 enables the hook 704 to move bi-directionally relative to the fuselage y-axis direction 214 and/or the fuselage x-axis direction 216 to adjust (e.g., increase or maximize) contact surface areas between the hook 704 and the stringer 208 and/or ease of installation or removal between the hook 704 and the stringer 208.

The adjustor 724 of the illustrated example includes a knob 732 and a pivot 734. To adjust the hook 704 relative to the support plate 702, the knob 732 is rotated in a first direction 736 about a longitudinal axis 738 of the knob 732 to loosen a connection (e.g., decrease friction) between the hook 704 and the support plate 702 and enable movement of the hook 704 relative to the support plate 702 about the pivot 734 (e.g., an axis of rotation of defined by the pivot) and/or enable movement of the hook 704 in a lateral (e.g., a horizontal) direction away from the support plate 702. The knob 732 is rotated in a second direction 740 about the longitudinal axis 738 opposite the first direction 736 to tighten or clamp the connection (e.g., increase friction) between the hook 704 and the support plate 702 to prevent or restrict rotation movement of the hook 704 relative to the support plate 702 about the pivot 734 and/or enable movement of the hook 704 in a lateral (e.g., horizontal) direction of the hook 704 towards the support plate 702. Thus, in operation, the knob 732 of the adjustor 724 may be loosened to enable the hook 704 to pivot relative to the support plate 702 and/or the stringer 208 and the knob 732 may be tightened to lock or secure the position of the hook 704 relative to the support plate 702 and/or the stringer 208. The support plate 702 of the illustrated example includes an opening 742 to receive a bushing 744 defining the pivot 734 and an opening 745 to receive a threaded shaft of the knob 732. The support plate 702 and/or the hook 704 may composed of, for example, metal, plastic, rubber, composite material, and/or any other material(s).

Additionally, at least portions of the support plate 702 of the illustrated example include a sheath or protector 746 to protect the frame 206 and/or the stringers 208 of the fuselage portion 200 from tool marks or damage when the lateral beam 402a is coupled or decoupled to the fuselage portion 200. In particular, at least portions of a perimeter 748 of the support plate 702 include the protector 746. The protector 746 of the illustrated example is composed of, for example, a polyurethane material, a rubber material and/or any other material(s) that may be overmolded and/or attached to the support plate 702. The hook 704 of the illustrated example also includes a hook protector 750 coupled or attached to an outer surface 752 of the hook 704 and spans between the respective first edge 728 and the second edge 730. The hook protector 750 may be composed of plastic (e.g. plastisol), rubber, polyurethane and/or any other material(s) to protect the frame 206 and/or the stringer 208 from tool marks or damage during assembly or disassembly of the lateral beam 402a from the fuselage portion 200. In some examples, the lateral beam 402a, the support plate 702 and/or the hook 704 may be formed as a unitary structure or body (e.g., via injection molding) and/or may be composed of the same or similar material(s) or different material(s). In some examples, the lateral beam 402a and the support plate 702 are formed as a unitary body or structure and the hook 704 is pivotally coupled to the support plate 702.

FIG. 8A is another perspective view of the first end 606 of the lateral beam 402a of FIG. 7. FIG. 8B is a perspective view of the hook 704 of FIGS. 7 and 8A. Referring to FIGS. 8A and 8B, the hook 704 of the illustrated example is a body 802 defining a length between the first edge 728 of the hook 704 and the second edge 730 of the hook 704. The hook 704 of the illustrated example has a first wall 804 and a second wall 806 protruding from an upper surface 808 to define a stringer receiving cavity 810. In other words, the hook 704 of the illustrated example has a U-shaped profile. A hook plate 812 extends from the second wall 806 and includes a first face 814 (FIG. 8B) opposite a second face 816 (FIG. 8A). The first face 814 of the hook plate 812 engages a second face 818 of the support plate 702 (opposite the first face 712) when the hook 704 is coupled to the support plate 702. The hook plate 812 includes a threaded opening 820 (e.g., a boss) to receive a threaded shaft (e.g., a threaded stud or fastener) of the knob 732. The hook plate 812 of the illustrated example includes an opening 822 to receive the bushing 744 defining the pivot 734. The hook plate 812 of the illustrated example has a triangular profile having side edges that have respective ends adjacent the respective first and second side edges 728 and 730 of the second wall 806 and converge to a common point adjacent the pivot 734.

To prevent damage to the stringer 208 (FIG. 2) when the hook 704 is engaged with the stringer 208, the connector 408 of the illustrated example includes a hook edge protector 824. The hook edge protector 824 is coupled to the first wall 804 of the hook 704. For example, the hook edge protector 824 encases an end of the first wall 804 when the hook edge protector 824 is coupled to the first wall 804. The hook edge protector 824 of the illustrated example at least partially projects into the stringer receiving cavity 810 formed by the hook 704. Additionally, the connector 408a of the illustrated example includes a stop block 826. The stop block 826 protrudes from the hook 704 adjacent the second edge 730 of the hook 704 and includes a frame engaging face 828. The stop block 826 of the illustrated example is formed as a unitary structure with the hook 704. Additionally, at least a portion of the stop block 826 and/or the frame engaging face 828 may be composed of a plastic material to protect the frame 206 (FIG. 2) from damage when the stop block 826 is in engagement with the frame 206. For example, at least a portion of the stop block 826 and/or the frame engaging face 828 may be overmolded with a plastic or rubber material such as, for example, a polyurethane, plastisol, and/or any other suitable material. The frame engaging face 828 of the stop block 826 is to engage the frame 206 (FIG. 2) when the lateral beam 402a is coupled to the stringer 208 (FIG. 2) of the fuselage portion 200. In particular, the stop block 826 transfers loads caused by deflection of the lateral beam 402a to the frame 206 and away from the stringer 208. Additionally or alternatively, the stop block 826 locates or positions the support plate 702 relative to the stringer 208 in the fuselage x-axis direction 216 and the fuselage y-axis direction 214.

Figure 8C:
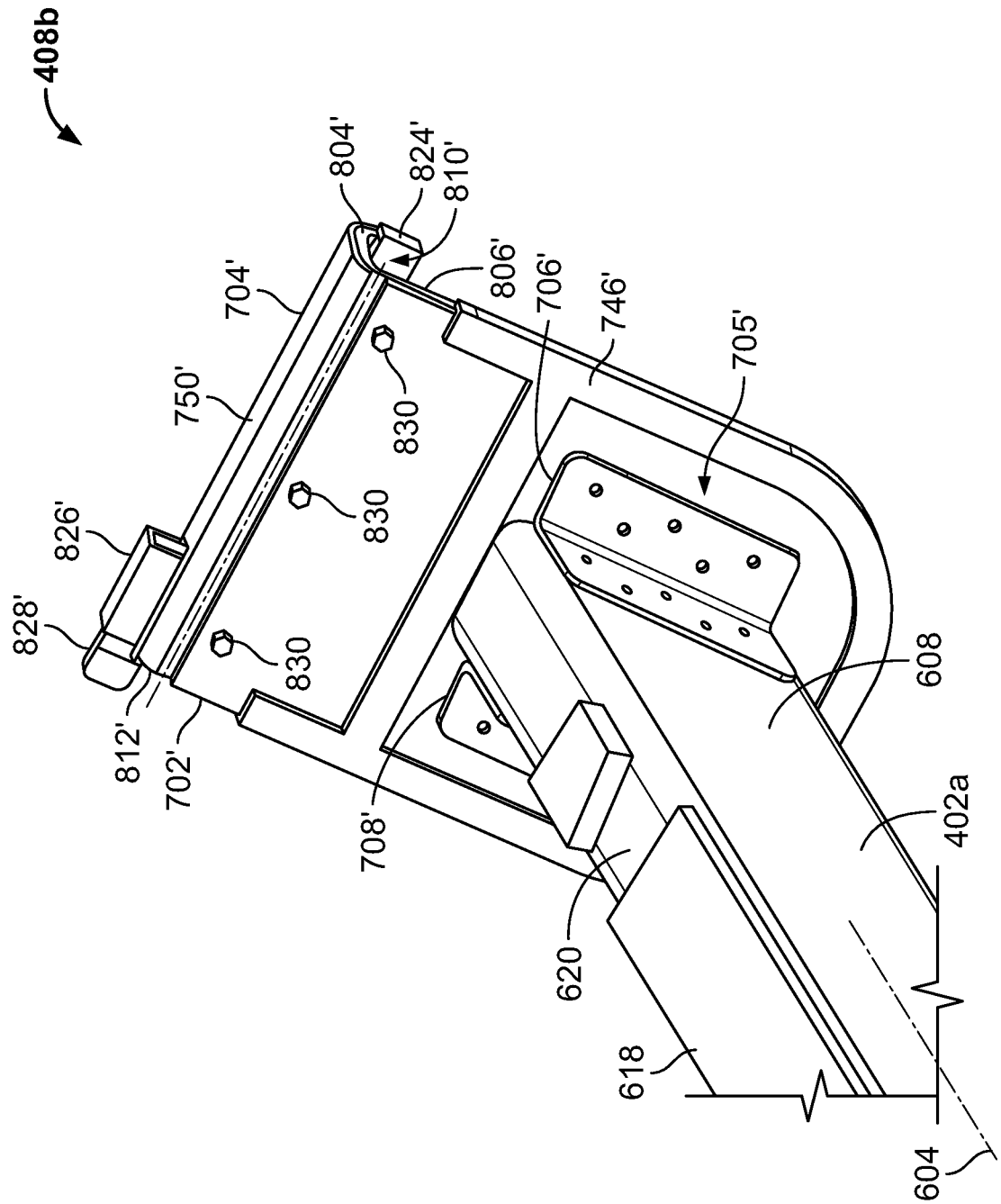
FIG. 8C is a perspective view of a second connector of the lateral beam of FIG. 6.

FIG. 8C is a perspective view of the second connector 408b of the lateral beam 402a. The second connector 408b of the illustrated example is substantially similar to the first connector 408a. Those components of the second connector 408b that are substantially similar or identical to the components of the first connector 408a described above in connection with FIGS. 7, 8A and 8B and that have functions substantially similar or identical to the functions of those components will not be described in detail again below. Instead, the interested reader is referred to the above corresponding descriptions. To facilitate this process, similar reference numbers including a prime symbol will be used for like structures.

The second connector 408b of the illustrated example includes a support plate 702' and a hook 704'. For example, the second connector 408b is coupled to the lateral beam 402a via a beam/support interface 705' in substantially the same manner as the first connector 408a (e.g., via a beam/support plate interface similar to the beam/support plate interface 705). For example, the support plate 702' of the second connector 408b is coupled to the second end 608 of the lateral beam 402a via a first bracket 706' (e.g., an L-bracket) and a second bracket 708' (e.g., an L-bracket). In some examples, the support plate 702', the hook 704' and/or the lateral beam 402a may be formed as a unitary body.

Additionally, the support plate 702' and the hook 704' of the second connector 408b are substantially similar to the support plate 702 and the hook 704 of the first connector 408a. For example, the support plate 702' and/or the hook 704' of the second connector 408b may be composed of, for example, metal, plastic, rubber, composite material and/or any other material(s). Additionally, at least portions of the support plate 702' includes a sheath or protector 746' and the hook 704' includes a hook protector 750', a first wall 804', a second wall 806', a stringer cavity 810', a hook plate 812', a hook edge protector 824', a stop block 826', and/or a frame engaging face 828'.

The hook 704' of the second connector 408b is fixed relative to the support plate 702'. To fix the support plate 702' relative to the hook 704', the example hook 704' is coupled to the support plate 702' via, for example, fasteners 830 (e.g., bolts). Thus, the hook 704 of the first connector 408a is adjustable relative to the support plate 702 of the first connector 408a and/or the lateral beam 402a, and the hook 704' of the second connector 408b is fixed (e.g., non-adjustable or non-movable) relative to the support plate 702' of the second connector 408b and/or the lateral beam 402a. Unlike the first connector 408a the second connector 408b of the illustrated example does not include the adjustor 724 provided by the first connector 408a. In other words, the support plate 702' of the second connector 408b does not include the knob 732, the opening 735, the pivot 734, and/or the bushing 744 provided by the support plate 702 of the first connector 408a. Similarly, the hook 704' of the second connector 408b does not include the threaded opening 820 and the opening 822 provided by the hook 704 of the first connector 408a. In some instances, the hook plate 812' of the hook 704' of the second connector 408b has a rectangular or square profile instead of a triangular profile as shown in FIGS. 7, 8A and 8B. During assembly, the second connector 408b may provide a reference when engaged with the stringer 208 and the first connector 408a may be adjusted via the adjustor 724 to enable the upper surface 620 (e.g., the longitudinal axis 604) of lateral beam 402a to be substantially parallel or aligned relative to Earth.

Figure 9:
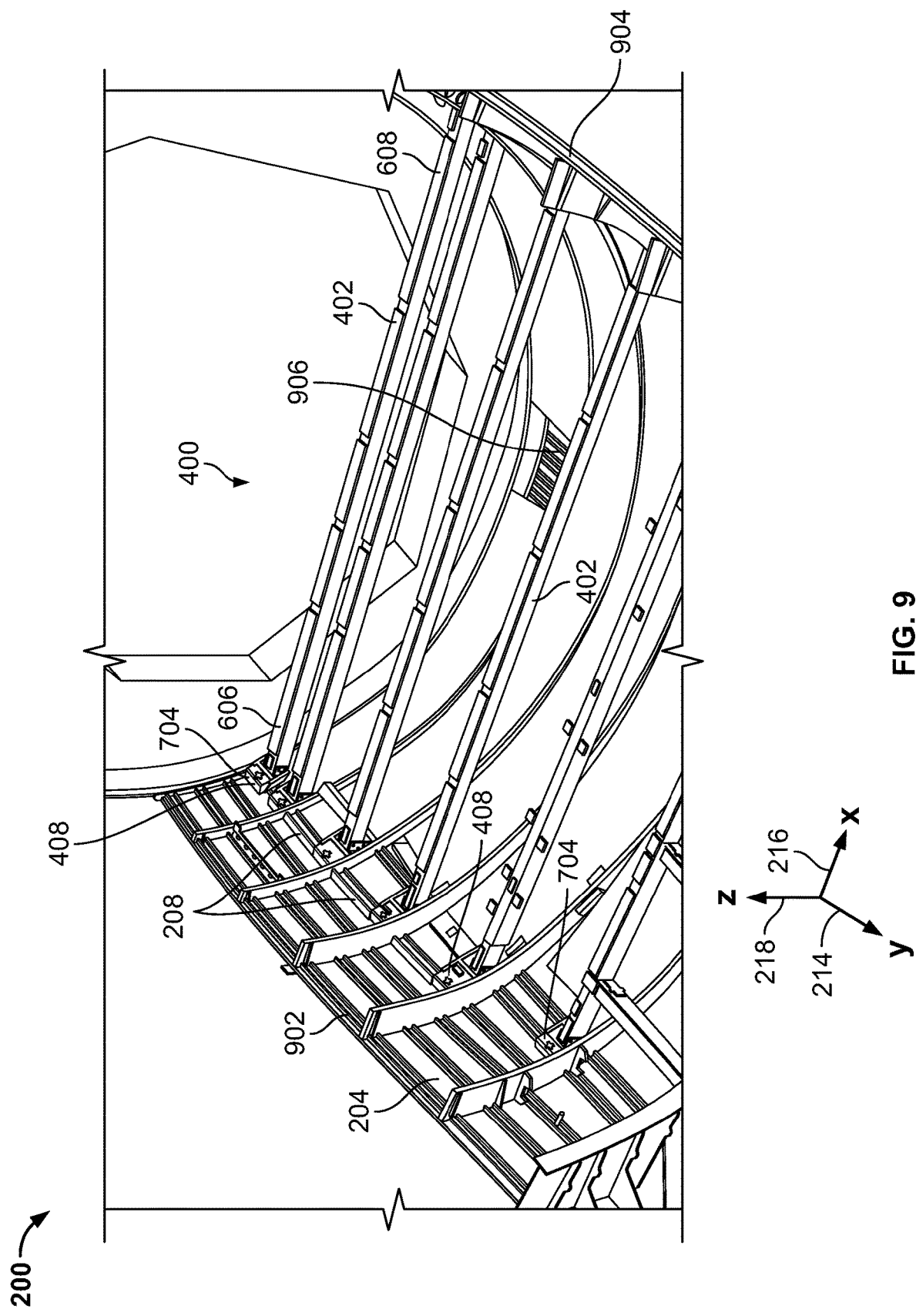
FIG. 9 is a partial, perspective view of the example frame assembly of FIG. 4 coupled to the example fuselage portion.

FIG. 9 is a partial perspective view of the fuselage portion 200 in a pre-assembled state showing the example frame assembly 400 of the illustrated example is coupled to the fuselage portion 200. As shown in FIG. 9, the lateral beams 402 are coupled to respective stringers 208 of the fuselage portion 200. For example, the lateral beams 402 are coupled to a first side 902 of the fuselage portion 200 (e.g., the lower fuselage portion 204) and a second side 904 of the fuselage portion 200 (e.g., the lower fuselage portion 204) opposite the first side 902 via the connectors 408. More specifically, the connectors 408 of the lateral beams 402 engage respective stringers 208 on the first side 902 of the fuselage portion 200 and the second side 904 of the fuselage portion. When the lateral beams 402 are coupled to the first and second sides 902 and 904 of the fuselage portion 200, the lateral beams 402 are suspended (e.g., in the air) in the fuselage portion 200 (e.g., across the fuselage portion 200). For example, the lateral beams 402 are lifted away or spaced from a bottom surface 906 of the lower fuselage portion 204. Thus, the lateral beams 402 are coupled to the respective stringers 208 without screws, nuts, bolts or the like. On the contrary, the hook 704 of the first connector 408a and the hook 704' of the second connector 408b enable coupling with the stringers 208 (e.g., via interference fit connection). In this manner, the connectors 408 enable quick coupling and/or decoupling of the lateral beams 402 relative to the fuselage portion 200 by allowing the hooks 704, 704' and, more generally the lateral beams 402, to be lifted upward or downward along the fuselage z-axis direction 218 relative to the stringers 208 to couple or decouple the lateral beams 402 to the fuselage portion 200.

Likewise, also referring to FIG. 4, the bridge assembly 410 is positioned in the fuselage portion 200 without needing to attach the bridge assembly 410 to the frame 206 and/or the fuselage portion 200 via screws, bolts or the like. For example, the front beam 412, the intermediate beam 416 and the rear beam 414 are placed or dropped (e.g., rest) in the holding brackets 418 without any other fasteners needed to retain the front beam 412, the rear beam 414 and the intermediate beam 416 together. With the bridge assembly 410 positioned in the fuselage portion 200, the longitudinal beams 404 are then coupled to the end beam 420 and the front beam 412 of the bridge assembly 410. In particular, the first ends 426a of the respective longitudinal beams 404 are coupled to the respective interface connectors 424 of the end beam 420, and the second ends 428a of the longitudinal beams 404 are coupled to the respective interface connectors 424 of the front beam 412. Similarly, the longitudinal beams 406 are coupled to the rear beam 414 of the bridge assembly 410 and the carriage 422. In particular, the first ends 426b of the longitudinal beams 406 are coupled the respective interface connectors 424 of the rear beam 414 and the second ends 428b of the longitudinal beams 406 are coupled the respective interface connectors 424 of the carriage 422. The longitudinal beams 404 and 406 of the illustrated example couple to the interface connectors 424 by placing (e.g., resting) the respective first ends 426a, 426b and the second ends 428a, 428b in the beam receiving cavity 512 of the respective interface connectors 424 without requiring additional screws, bolts or the like.

Figure 10:
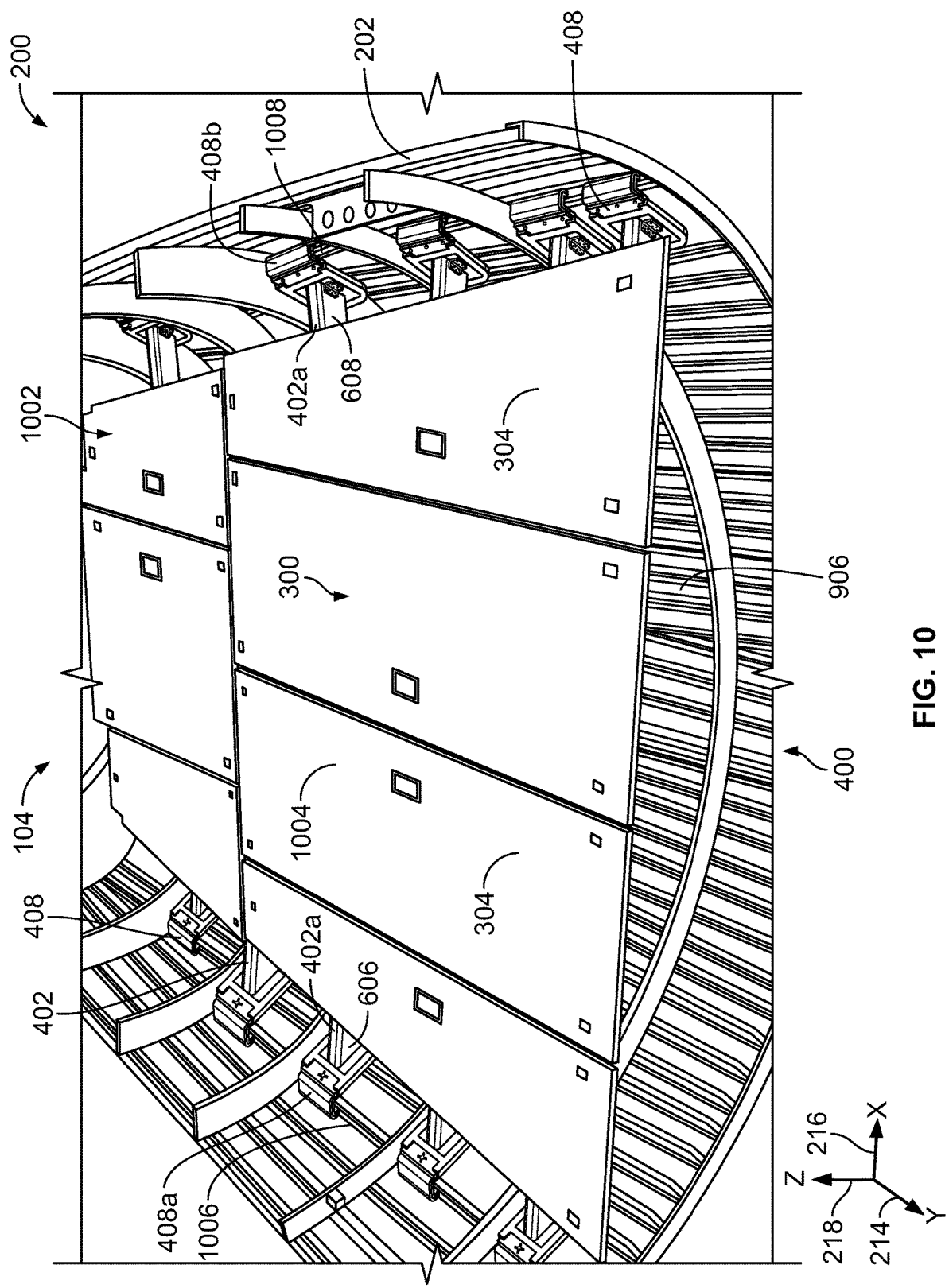
FIG. 10 is a partial, perspective view of the example scaffolding coupled to the fuselage portion.

FIG. 10 is a partial perspective view of the example fuselage portion 200 of FIG. 9 showing the modular panels 304 positioned on the frame assembly 400. The frame assembly 400 of the illustrated example supports the modular panels 304 to provide a walking surface 1002 (e.g., a substantially horizontal walking surface, a walking surface substantially parallel to Earth). Further, when the modular panels 304 are coupled to the frame assembly 400, the modular panels 304 and/or the frame assembly 400 do not have any protrusions extending above an upper surface 1004 (e.g., the walking surface 1002) of the modular panels 304 that may otherwise present an obstruction or tripping hazard. As shown in FIG. 10, both the modular panels 304 and the lateral beams 402 of the illustrated example are suspended over the bottom surface 906 of the fuselage portion 200 via engagement of the connectors 408 with the respective stringers 208 of the fuselage portion 200.

To assemble the first support structure 401, the lateral beam 402a is positioned between the first side 902 (e.g., a wall) and the second side 904 (e.g. a wall). For example, the first connector 408a adjacent the first end 606 of the lateral beam 402a engages or couples to a first stringer 1006 on the first side 902 of the fuselage portion 200, and the second connector 408b adjacent the second end 608 of the lateral beam 402a engages or couples to a second stringer 1008 on the second side 904 of the fuselage portion 200 opposite the first side 902.

In some instances, an angle between the hook 704 of the first connector 408a is adjusted relative to an angle of the first stringer 1006. For example, a longitudinal axis of the first stringer 1006 may be at an incline relative to a longitudinal axis of the second stringer 1008, which may cause the upper surface 620 of the lateral beam 402a to be canted or tilted and/or otherwise non-parallel or flat relative to the walking surface 1002 and/or Earth. In some such examples, the hook 704' of the second connector 408b is fixed and provides a guide or reference for the lateral beam 402a. In some such examples, the hook 704 of the first connector 408a can be adjusted relative to the first stringer 1006 of the first side 902 of the fuselage portion 200 via the adjustor 724 (FIG. 7) after the lateral beam 402a is coupled to the first stringer 1006 and the second stringer 1008. In other words, the hook 704 of the first connector 408a can be adjusted (e.g., relative to the first stringer 1006 and/or the support plate 702 (FIG. 7) of the first connector 408a) independently of the hook 704' of the second connector 408b. Thus, if the first stringer 1006 is not parallel relative to the second stringer 1008 and the upper surface 620 of the lateral beam 402a is tilted, canted or other non-parallel relative to the walking surface 1002 or Earth, the hook 704 of the first connector 408a can be adjusted via the adjustor 724 to align relative to the first stringer 1006 and cause the upper surface 620 of the lateral beam 402a to be substantially parallel to the walking surface 1002 and/or Earth. After the lateral beam 402a is coupled to the first and second stringers 106 and 108 to span an area defined between the first stringer 1006 and the second stringer 1008 and the upper surface 620 of the lateral beam 402a is positioned parallel relative to earth (e.g., via the adjustor 724), the modular panels 304 are positioned on the upper surface 620 of the lateral beam 402a. The anti-skid layer 618 (FIG. 6) prevents the modular panels 304 from moving in the fuselage y-axis direction 214 and/or the fuselage x-axis direction 216. Further, the modular panel hard stops 622 prevent and/or guide edges of the modular panels 304 from moving toward the connectors 408 in the fuselage x-axis direction 216.

FIG. 11A is a partial view of the first connector 408a coupled to the first stringer 1006 of the fuselage portion 200. FIG. 11B is an enlarged view of the example first connector 408a of FIG. 11A. Referring to FIGS. 11A and 11B, the hook 704 of the first connector 408a is in engagement with the first stringer 1006 of the fuselage portion 200 and is positioned adjacent the frame 206. More specifically, the stringer receiving cavity 810 of the hook 704 receives at least a portion of an upper surface 1102 of the first stringer 1006 and the first wall 804 and the second wall 806 (FIG. 8) of the hook 704 project at least partially toward a lower surface 1104 of the stringer 208 opposite the upper surface 1102. The hook edge protector 824 of the hook 704 engages a surface 1106 of the stringer 208 (e.g., positioned) between the stringer 208 and the skin 210 of the fuselage portion 200. Additionally, the adjustor 724 may be employed to adjust the hook 704 relative to a longitudinal axis 1108 of the stringer 208. In other words, the first edge 728 of the hook 704 may be moved relative to the second edge 730 of the hook 704 about the pivot 734 to enable the stringer receiving cavity 810 to be positioned substantially parallel relative to the longitudinal axis 1108 of the first stringer 1006 and/or to enable the upper surface 808 (FIG. 8) of the hook 704 to be substantially parallel relative to the upper surface 1102 of the first stringer 1006. In this manner, a contact surface area between the hook protector edge 824 and the surface 1106 of the first stringer 1006 can be increased (e.g., maximized) to distribute evenly the load on the first stringer 1006. Once the hook 704 is adjusted, the adjustor 724 may be tightened to lock the position of the hook 704 (e.g., prevent rotation of the hook 704 relative to the pivot provided by the bushing 744) to stabilize the lateral beam 402a (e.g., prevent the lateral beam 402a from canting, tilting, etc., relative to the walking surface 1002 (FIG. 10)).

In the illustrated example, the stop block 826 is engaged with the frame 206. In particular, as more clearly shown in FIG. 11B, the frame engagement face 828 of the stop block 826 is to engage or contact (e.g., pressed against or engaged with) a surface 1110 of the frame 206 when the hook 704 is positioned on the stringer 1002. The stop block 826 is to transfer deflection loads to the frame 206 when the lateral beam 402a deflects along the longitudinal direction of the lateral beam 402a. In this manner, loads caused by deflection of the lateral beam 402a (e.g., in a direction toward the bottom surface 906 of the fuselage portion 200) may be transferred to the frame 206 and away from the first stringer 1006 to prevent the lateral beam 402a from pulling the stringer 208 away from the skin 210 and/or the frame 206. The second connector 408b couples to the second stringer 1008 (FIG. 10) in substantially the same manner as the first connector 408a shown in FIGS. 11A and 11B.

Figure 12:
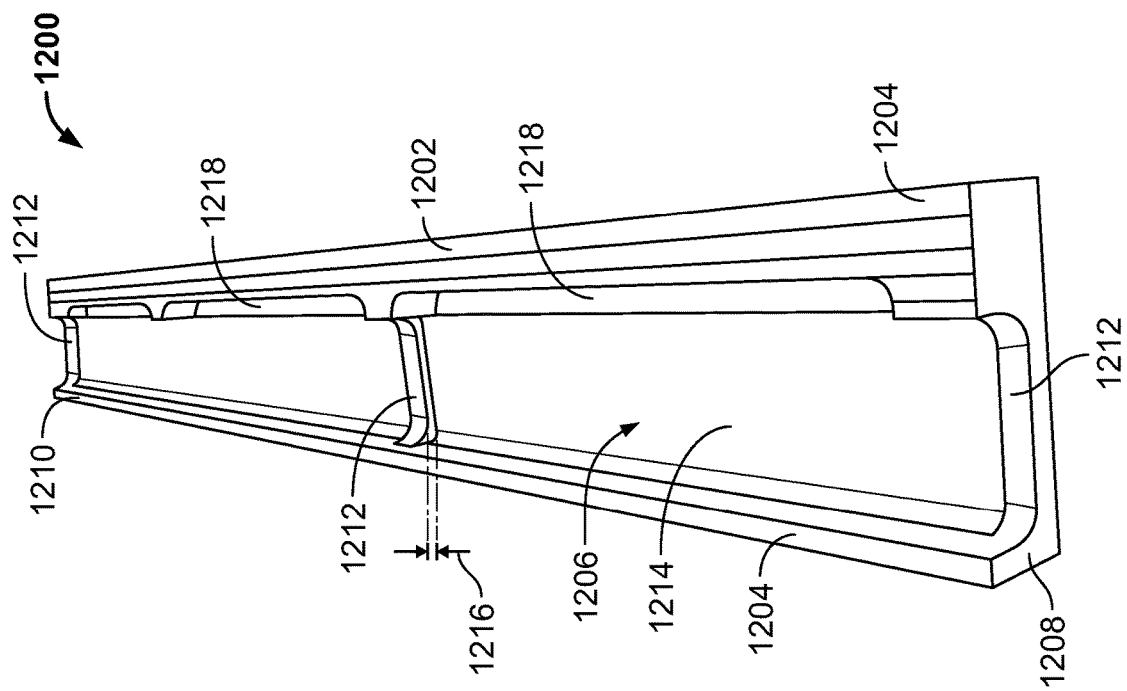
FIG. 12 illustrates an example mold to couple an anti-skid layer to an upper surface of a beam of the example frame assembly of FIG. 4.

FIG. 12 is a perspective view of a mold 1200 that may be employed to bond or couple the anti-skid layer 618 to the lateral beam 402a of FIG. 6. The mold 1200 may be used to couple an anti-skid layer (e.g., the anti-skid layer 618) to the longitudinal beams 404 and 406, the front beam 412, the rear beam 414 and/or the intermediate beam 416 of FIG. 4. The mold 1200 of the illustrated example includes a body 1202 having walls 1204 to define a cavity 1206 between a first end 1208 of the body 1202 and a second end 1210 of the body 1202 opposite the first end 1208. The mold 1200 of the illustrated example includes spacers or supports 1212 extending from a lower surface 1214 of the cavity 1206 to define a thickness or gap 1216. The supports 1212 elevate the upper surface 620 (FIG. 6) of the lateral beam 402*a* from the lower surface 1214 defining the cavity 1206 such that a space defined by the gap 1216 is provided between the lower surface 1214 of the mold 1200 and the upper surface 620 of the lateral beam 402*a* when the lateral beam 402*a* is positioned in the mold 1200. The mold 1200 of the illustrated example includes one or more access ports 1218 (e.g., slots or channels) in communication with the gap 1216.

Figure 13:
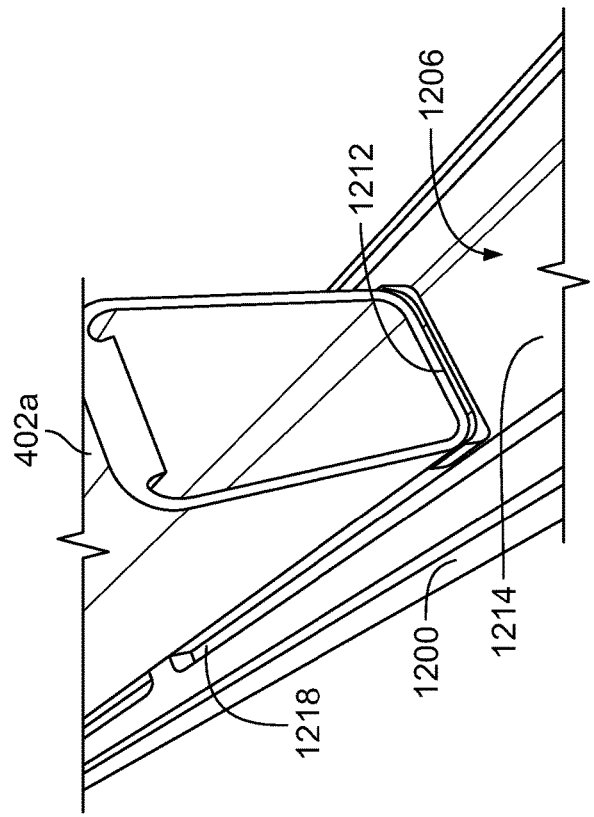
FIG. 13 illustrates a partial, perspective view of a beam positioned in the example mold of FIG. 12.

FIG. 13 is a partial perspective view of the lateral beam 402*a* positioned in the mold 1200. The lateral beam 402*a* of FIG. 12 is shown prior to attachment of the first connector 408*a* and the second connector 408*b* to the respective first end 606 and the second end 608. The lateral beam 402*a* is positioned on the supports 1212 with the upper surface 620 of the lateral beam 402*a* oriented toward the lower surface 1214 of the cavity 1206 to form the gap 1216 between the upper surface 620 of the lateral beam 402*a* and the lower surface 1214 of the cavity 1206.

FIG. 14 illustrates a method 1400 of injecting an anti-skid material 1402 in the gap 1216 (FIG. 12) formed between the upper surface 620 of the lateral beam 402*a* and the cavity 1206 (FIG. 12) of the mold 1200. In particular, the anti-skid material 1402 is in a non-cured state (e.g., a liquid form) when injected into the gap 1216 via the access ports 1218 using an injection nozzle 1404. The anti-skid material 1402 is polyurethane material. In addition, the upper surface 620 and/or the lateral beam 402*a* is composed of a composite material (e.g., carbon fiber composite). After the anti-skid material 1402 is injected into the gap 1216, the anti-skid material 1402 cures or solidifies (e.g., after approximately between 2 hours and 4 hours). During the curing process, the anti-skid material 1402 bonds (i.e., attaches and/or hardens) to the upper surface 620 of the lateral beam 402*a* to form the anti-skid layer 618. In other words, the anti-skid material 1402 attaches to the lateral beam 402 as a result of the curing process without any further process(es). Additionally, the co-bonding of the anti-skid material 1402 and the lateral beam 402*a* occurs without the use of adhesives and/or other bonding agents or material(s). Further, no secondary bonding procedures are needed to establish the attachment between the anti-skid layer 618 and the lateral beam 402*a*. In some examples, the upper surface 620 of the lateral beam 402*a* may be cleaned prior to attaching the anti-skid material 1402. FIG. 15 illustrates the anti-skid layer 618 bonded to the lateral beam 402*a* after the anti-skid material 1402 cures and the lateral beam 402*a* is removed from the mold 1200.

Although the scaffolding is described herein to facilitate manufacturing of a fuselage of aircraft, in some examples, the scaffolding may be employed to provide an elevated platform for painting ceilings, construction, roofing, assembly of a housing such as a boat, a building, a spaceship, a recreational vehicle (RV) and/or any other activity requiring use of an elevated platform. In some such examples, the scaffolding may include a first frame defining the first side wall and a second frame defining the second side wall. For example, die first land the second side wall may each include end supports and/or intermediate supports positioned between the end supports, and a plurality of spaced apart (e.g., vertically spaced) cross-bars or latching bars spanning across the end supports and/or the intermediate supports to provide a latch for the first connector of the beam and the second connector of the beam. The first frame and the second frame may be removably positioned within an area requiring an elevated platform.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A scaffolding apparatus comprising:
a beam defining a length between a first end of the beam and a second end of the beam opposite the first end, the length of the beam to span between a first side of a fuselage portion of an aircraft and a second side of the fuselage portion opposite the first side; and
a first connector coupled to the first end of the beam, the first connector structured to engage a first stringer on the first side of the fuselage portion to removably couple the first end of the beam to the fuselage portion, the first connector being pivotally coupled to the beam, the first connector structured to pivot relative to the beam to adjust an angle of an upper surface of the beam relative to horizontal in an aft-fore direction of the fuselage portion after the first connector is engaged with the first side of the fuselage portion.

2. The apparatus of claim 1, wherein the first connector includes a first hook, the beam including a first plate fixed to the beam and the first hook being pivotally coupled to the first plate.

3. The apparatus of claim 2, wherein the first hook engages the first stringer of the fuselage portion to couple the first end of the beam to the fuselage portion.

4. The apparatus of claim 2, wherein the first plate and the first hook are coupled via an adjustor, the adjustor to allow the first hook to rotate about a pivot to adjust an angle of the first hook relative to an angle of the first stringer to which the first hook is to engage to enable the first hook to mount substantially flush relative to the first stringer to distribute a load evenly on the first stringer.

5. The apparatus of claim 4, wherein the adjustor is to lock the first hook into place to stabilize the beam when the beam is coupled to the fuselage portion.

6. The apparatus of claim 1, wherein the beam is suspended in the fuselage portion such that a bottom surface of the beam is suspended from a ground surface of the fuselage portion when the beam is coupled to the fuselage portion.

7. The apparatus of claim 1, wherein the first connector includes a channel to receive at least a portion of the first stringer.

8. The apparatus of claim 1, wherein the first connector to pivot relative to the beam about a pivot axis that is non-perpendicular relative to a longitudinal axis of the beam.

9. The apparatus of claim 1, wherein the upper surface of the beam supports a walking surface of the scaffolding apparatus.

10. The apparatus of claim 1, further comprising a second connector coupled to the second end of the beam, the second connector structured to engage a second stringer on the second side of the fuselage portion to removably couple the second end of the beam to the fuselage portion.

11. The apparatus of claim 10, wherein the second connector includes a second plate and a second hook.

12. The apparatus of claim 11, wherein at least one of the first hook or the second hook has a U-shaped profile.

13. The apparatus of claim 10, wherein the beam, the first connector and the second connector restrict lateral movement along a longitudinal axis of the beam when the first connector is in engagement with the first stringer and the second connector is in engagement with the second stringer.

14. The apparatus of claim 10, wherein the first connector is to pivot relative to the beam after the first connector is coupled to the first stringer and the second connector is coupled to the second stringer.

15. The apparatus of claim 10, wherein the first connector and the second connector are structured to enable the beam to couple to the fuselage portion in response to moving the first connector toward the first stringer and the second connector toward the second stringer, and the first connector and the second connector structured to enable the beam to decouple from the fuselage portion in response to lifting the first connector away from the first stringer and the second connector away from the second stringer.

16. The apparatus of claim 10, wherein the first connector and the second connector are configured to enable decoupling of the beam relative to the fuselage portion in response to lifting the first and second connectors of the beam relative to the respective first and second stringers.

17. A support structure apparatus comprising:
a lateral beam;
a first connector coupled to a first end of the lateral beam, the first connector having a first support plate and a first hook pivotally coupled to the first support plate, the first hook to hook on to a first longitudinal beam of a housing to removably couple the first end of the lateral beam to the housing, the first hook to rotate relative to the first support plate about a pivot axis that intersects the first support plate, the first hook to pivot about the pivot axis to adjust an angle of an upper surface of the lateral beam relative to horizontal; and
a second connector coupled to a second end of the lateral beam, the second connector having a second support plate and a second hook, the second hook to hook on to a second longitudinal beam of the housing to removably couple the second end of the lateral beam to the housing, the first connector and the second connector configured to enable decoupling of the lateral beam relative to the housing in response to lifting the first and second connectors of the lateral beam relative to the respective first and second longitudinal beams, the first hook structured to pivot relative to the lateral beam to adjust the angle of the upper surface of the lateral beam when the first hook is in engagement with the first longitudinal beam and the second hook is in engagement with the second longitudinal beam.

18. The apparatus of claim 17, wherein the first hook includes a first hook edge protector that is to engage the first longitudinal beam of the housing when the first hook is coupled to the housing.

19. The apparatus of claim 18, wherein the first hook edge protector is to be positioned between the first longitudinal beam and the housing when the first hook is coupled to the first longitudinal beam.

20. The apparatus of claim 17, further comprising a stop block protruding from an edge of the first hook.

21. The apparatus of claim 20, wherein the stop block includes a frame engaging surface to engage a surface of a frame of the housing when the first hook is coupled to the first longitudinal beam, the stop block to transfer deflection loads to the frame when the lateral beam is to deflect in a direction along a longitudinal axis of the lateral beam.

22. The apparatus of claim 17, wherein an upper surface of the lateral beam adjacent the first connector includes an anti-skid layer attached to the upper surface of the lateral beam.

23. The apparatus of claim 17, wherein the first hook is to pivot about the pivot axis to adjust a position of the first hook relative to the lateral beam such that a longitudinal axis of the first longitudinal beam is substantially parallel to a longitudinal axis of the first hook when the first hook is in engagement with the first longitudinal beam and the second hook is in engagement with the second longitudinal beam.

24. A method comprising:
positioning a lateral beam between a first side of a fuselage and a second side of the fuselage;
lowering a first end of the lateral beam toward a first stringer on the first side of the fuselage;
removably coupling the first end of the lateral beam to the first stringer on the first side of the fuselage in response to lowering the first end of the lateral beam and placing a first hook of a first connector at the first end of the lateral beam on the first stringer;
lowering a second end of the lateral beam toward a second stringer on the second side of the fuselage;
removably coupling the second end of the lateral beam to the second stringer of the fuselage in response to lowering the second end of the lateral beam and placing a second hook of a second connector at the second end of the lateral beam on the second stringer; and
rotating the second hook of the second connector pivotally coupled to the second end of the lateral beam relative to the lateral beam about a pivot axis that is non-perpendicular relative to a longitudinal axis of the lateral beam to adjust an angle of the second hook relative to an angle of the second stringer.

25. The method of claim 24, further comprising positioning a floor board on an upper surface of the lateral beam when the lateral beam is coupled to the first and second stringers and spans across an area defined between the first and second sides of the fuselage.

26. The method of claim 24, further including lifting the first end of the lateral beam away from the first stringer and lifting the second end of the lateral beam away from the second stringer to decouple the first connector from the first stringer and the second connector from the second stringer.

27. The method of claim 24, wherein the first hook is fixed to the first end of the lateral beam.

* * * * *